US009464234B1

United States Patent
Tharpe, Jr.

(10) Patent No.: US 9,464,234 B1
(45) Date of Patent: Oct. 11, 2016

(54) SYSTEMS, APPARATUS AND METHODS FOR OPTIMIZING THE RAPID PYROLYSIS OF BIOMASS

(71) Applicant: John M. Tharpe, Jr., Albany, GA (US)

(72) Inventor: John M. Tharpe, Jr., Albany, GA (US)

(*) Notice: Subject to any disclaimer, the term of this patent is extended or adjusted under 35 U.S.C. 154(b) by 665 days.

(21) Appl. No.: 13/740,650

(22) Filed: Jan. 14, 2013

Related U.S. Application Data

(63) Continuation-in-part of application No. 13/533,258, filed on Jun. 26, 2012, which is a continuation of application No. 12/466,501, filed on May 15, 2009, now Pat. No. 8,206,471, which is a continuation-in-part of application No. 12/361,743, filed on Jan. 29, 2009, now Pat. No. 8,353,973.

(60) Provisional application No. 61/053,386, filed on May 15, 2008.

(51) Int. Cl.
*C10B 53/02* (2006.01)
*C10B 1/04* (2006.01)

(52) U.S. Cl.
CPC *C10B 53/02* (2013.01); *C10B 1/04* (2013.01)

(58) Field of Classification Search
CPC .............. B01J 7/00; C10J 3/00; C10B 49/08
See application file for complete search history.

(56) References Cited

U.S. PATENT DOCUMENTS

| 4,324,643 A * | 4/1982 | Durai-Swamy | C10B 49/20 201/2.5 |
| 6,290,743 B1 * | 9/2001 | Alvin | B01D 46/0005 55/482 |
| 2002/0159929 A1 * | 10/2002 | Kaneko | C07C 29/152 422/140 |
| 2008/0197012 A1 * | 8/2008 | Berruti | C10B 47/24 201/31 |
| 2009/0025278 A1 * | 1/2009 | Werner | C10L 5/361 44/307 |

* cited by examiner

*Primary Examiner* — Matthew Merkling
(74) *Attorney, Agent, or Firm* — Allen Dyer Doppelt Milbrath & Gilchrist

(57) ABSTRACT

Efficient biomass conversion systems, methods and apparatus utilize a fast pyrolysis unit installed at locations having substantial quantities of biomass, with the biomass fed into the fast pyrolysis unit under pyrolytic reaction conditions, and with exhaust gases containing entrained matter resulting from the pyrolytic reactions being separated into char and bio-fuel constituents.

19 Claims, 19 Drawing Sheets

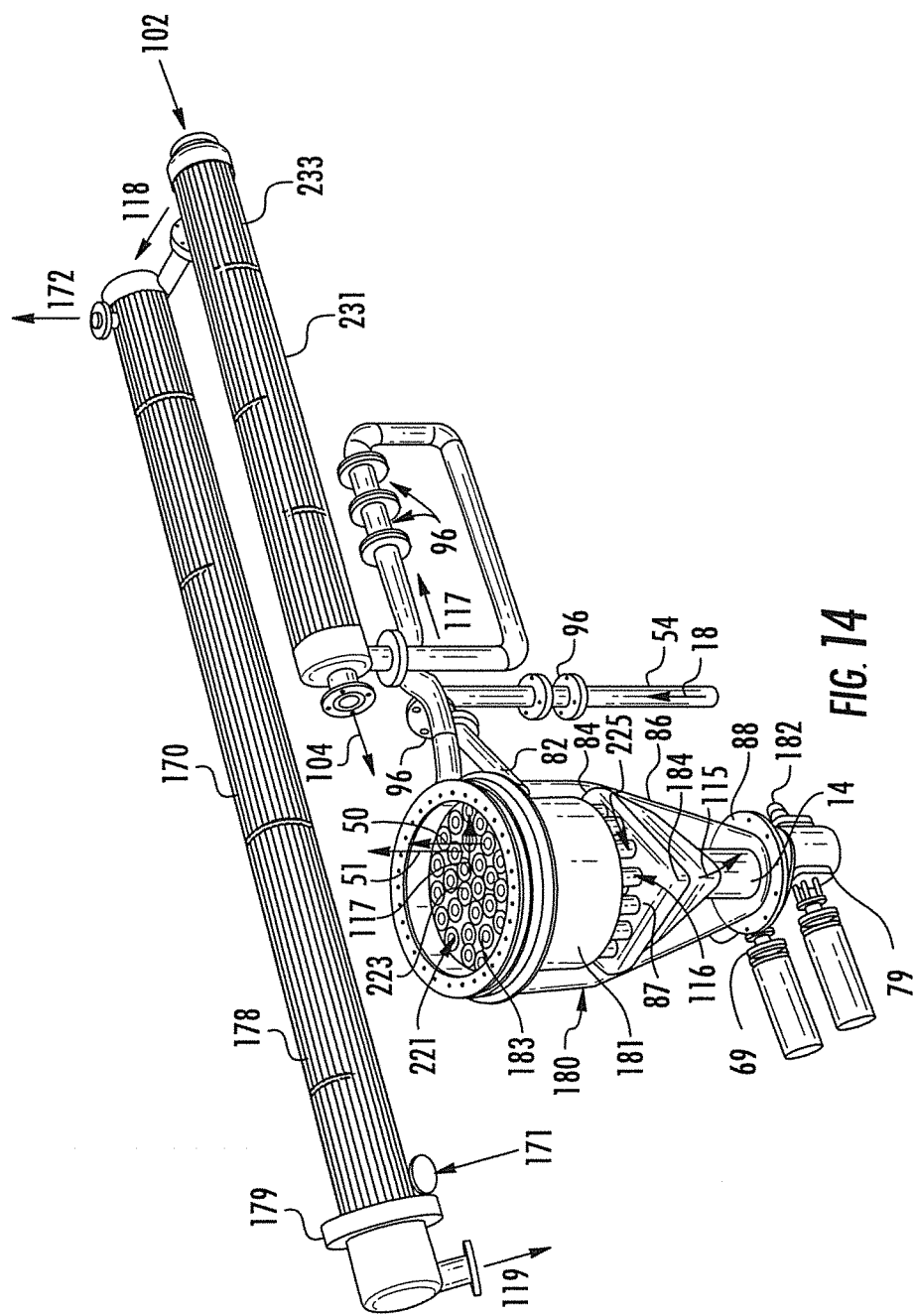

| | |
|---|---|
| 960 | PROCESS CONTROL PROGRAM |
| 961 | MONITOR PYROLYSIS UNIT PRESSURE 240 |
| 962 | 240 IS OVER 234 INITIATE CIP |
| 800 | CIP SUBROUTINE |
| 810 | HOT GAS FILTER CLEAN IN PLACE |
| 811 | STOP BIOMASS 12 |
| 812 | STOP FUEL 17 |
| 813 | STOP CHAR 15 |
| 814 | INCREASE AIR FLOW 104 |
| 815 | MONITOR HOT GAS FILTER TEMPERATURE |
| 816 | CONTROL AIR FLOW 104 TO LIMIT HOT GAS TEMPERATURE |
| 817 | WHEN PRESSURE 240 DROPS BELOW 242 STOP CIP |
| 820 | BEGIN PYROLYSIS |
| 821 | SET AIR FLOWS 103 & 104 FOR IGNITION OF FUELS |
| 822 | START FUEL 17 |
| 823 | START CHAR 14 |
| 824 | ESTABLISH DESIRED COMBUSTION RATE |
| 825 | START BIOMASS 12 FOR PYROLYSIS |
| 961 | MONITOR PYROLYSIS UNIT PRESSURE 240 |

*FIG. 20*

SYSTEMS, APPARATUS AND METHODS FOR OPTIMIZING THE RAPID PYROLYSIS OF BIOMASS

CROSS-REFERENCE TO RELATED APPLICATIONS

This application is a continuation-in-part of application Ser. No. 13/533,258, filed Jun. 26, 2012, which is a continuation of application Ser. No. 12/466,501, filed May 15, 2009, (now U.S. Pat. No. 8,206,471), and is a continuation-in-part of application Ser. No. 12/361,743 filed Jan. 29, 2009, which claims priority to provisional application Ser. No. 61/053,386, filed May 15, 2008.

BACKGROUND

The present invention relates generally to systems, apparatus and methods for the production of energy products from carbonizable material such as biomass, and particularly such systems, apparatus and methods that employ fast pyrolytic reactions.

The United States faces substantial environmental issues from continuing reliance on existing energy sources. The burning of fossil fuels, such as coal and natural gas, results in the emission of excessive amounts of carbon dioxide into the atmosphere. The use of nuclear power raises the specter of ecological damage through the accidental release of radiation into the environment, as well as difficulties in safely disposing of spent nuclear fuel. Hydroelectric projects can disrupt local ecosystems, resulting in major reductions in fish populations, negative impacts on native and migratory birds and damage to river systems.

In recent years, biomass has gained popularity as an environmentally-sound alternative renewable energy source. Biomass, or the fuel products derived from it, can be burned to produce power. Unlike fossil fuels, however, carbon dioxide released from the burning of biomass does not contribute to the overall carbon dioxide content of the atmosphere. This is true because biomass is part of the world's atmospheric carbon cycle. For this reason, biomass is viewed as a renewable, carbon-neutral fuel.

As examples, processing facilities for forest products, used automotive tires and used railroad cross ties are substantial sources of biomass. The typical forest products facility uses some of its biomass in processing, while the remainder of the biomass is seen as a byproduct. One type of forest products processor that produces a large volume of biomass byproduct is a chip mill that processes small-sized timber. In the chip mill, logs are debarked and then ground into chips for transporting to other mills for further processing. Another type of sawmill is a chip and saw facility ("CNS facility"). A CNS facility produces dimensional lumber from timber that has a diameter ranging from mid-sized to small. Substantial sources of biomass are also available from other forest products facilities, such as large log processing plants, plywood plants, and oriented strand board (OSB) plants, among others.

A typical CNS facility generates an average of more than five-hundred tons of dry biomass byproducts per day. (According to Marks Mechanical Engineering Handbook, the standard for "dry" is defined as twelve percent moisture content or less.) These biomass byproducts typically consist of white chips, bark, sawdust, and wood shavings. The white chips produced by a CNS facility are generally sold to paper-producing mills for processing into paper and cellulose products. The bark, sawdust and shavings are either used at the CNS facility itself as a thermal energy source or sold as a byproduct. Pellet mills have begun to use the white chips and small logs for manufacturing pellets of high density biomass for use a fuel in combustion burner systems. The byproducts of lumber production facilities such as sawdust; planer mill shavings; and bark are not usable for paper production or for pellet production.

Fast pyrolysis is one process used to produce energy products from biomass. Fast pyrolysis utilizes temperatures of between about 450-600 degrees Celsius to rapidly heat biomass in the absence of oxygen. The process results in the creation of three products: bio-oil, char, and non-condensing gases. All three products are combustible.

Fuel needed to create and maintain such high temperatures in systems utilizing fast pyrolysis can represent a major operational expense. For this reason, it is desirable to employ systems that make the most of the heat produced. There are a number of strategies for accomplishing this.

One strategy employs techniques meant to optimize the transfer of thermal energy to individual particles of biomass within a pyrolysis chamber. This can be accomplished through the use of organic heat carriers such as hot char and inorganic heat carriers, such as sand. These particularized heat carriers circulate within the pyrolysis chamber and radiate heat to the biomass. Other techniques involve rapidly moving particles of feedstock within a pyrolysis chamber so as to force the particles into nearly continual contact with the hot walls of the chamber. Still other techniques circulate a heated gas stream through a pyrolysis chamber to transfer heat to the particles of biomass. Another strategy involves capturing the hot exhaust resulting from pyrolytic reactions in the pyrolysis chamber and re-circulating that hot exhaust to other parts of the system. Yet another strategy involves insulating the pyrolysis chamber to deter heat loss through the walls of the chamber.

What is needed are fast pyrolysis systems and methods that improve upon the conservation and reuse of existing heat. Also needed are fast pyrolysis systems and methods that are easily collocated with biomass generating facilities.

SUMMARY OF THE INVENTION

The present invention is directed to systems, apparatus and methods utilizing fast pyrolysis techniques to produce useful products in a facile manner. It is preferred although not critical that the systems be collocated with a facility such as a sawmill that generates biomass as a by-product, and where the exhaust from the fast pyrolysis process can be used to increase efficiency. To achieve these and other objectives, the present invention contemplates the provision of compact and portable systems and apparatus that employ a pyrolysis unit capable of capturing and reusing heat that might otherwise be lost to the outside environment. This invention discloses several embodiments for achieving these objectives.

In one embodiment of the present invention, a fast pyrolysis system and method is provided that employs an open loop heat exchanger comprising of generally concentric, intercommunicating chambers for rapidly pyrolysizing biomass to create energy products. The pyrolysis unit captures and reuses heat that might otherwise be lost to the ambient environment. Preferably, the generally concentric construction of the intercommunicating chambers conserves system-generated heat using the recirculation of hot exhaust resulting from pyrolytic reactions.

In a first example, a pyrolysis unit embodying features of the present invention includes an elongated, tubular combustion chamber and at least one elongated, tubular pyrolysis chamber. The chambers are preferably configured generally concentrically so that the combustion chamber is located substantially within the larger-diameter pyrolysis chamber. In embodiments including multiple pyrolysis chambers, each of the elongated, tubular pyrolysis chambers are preferably arranged with the combustion chamber in a generally concentric manner such that the combustion chamber is the innermost chamber, an inner pyrolysis chamber substantially surrounds the combustion chamber and, if desired, each successive pyrolysis chamber substantially surrounds a previous pyrolysis chamber.

One end of the combustion chamber is in communication with a proximate end of a concentric pyrolysis chamber. In embodiments including multiple pyrolysis chambers, an opposite end of the innermost pyrolysis chamber is also in communication with a proximate end of a next-innermost pyrolysis chamber. An opposite end of the next-innermost pyrolysis chamber is, in turn, in communication with a proximate end of a successive pyrolysis chamber, and so on for each successive pyrolysis chamber. In this way, a directed, generally-deoxygenated, heated gas stream flowing from the combustion chamber enters each pyrolysis chamber sequentially. The heated gas stream reverses direction at each junction of chambers such that the stream flows in a first direction through one chamber, and then flows in a second direction generally opposite to the first direction through an adjacent chamber. Each pair of adjacent chambers shares a common wall that separates the gas in each chamber while still conducting heat. For example, the combustion chamber and the inner pyrolysis chamber share a common wall. In addition to heat radiating from the heated gas stream passing through the chambers, each common wall of the pyrolysis unit also conducts heat from one chamber to the next. At the designed temperature of the combustion exhaust, the wall of the combustion chamber will also provide significant radiant heat transfer to the biomass flowing through the first pyrolysis chamber, thereby increasing the rate of heat transfer to the biomass.

A heat source is used to produce the directed, generally-deoxygenated heated gas stream. In one embodiment, this heat source is a burn enclosure with an igniter and is configured as part of the pyrolysis unit. A fuel-air mixture is injected under pressure into a first end of the burn enclosure and ignited by the igniter. A second opposite end of the burn enclosure joins an inlet end of the associated combustion chamber. The heated gas stream flows through the combustion chamber and out of the opposite end where it enters one or more pyrolysis chambers, each in turn. Alternate embodiments use other heat sources, such as a gas turbine in conjunction with a burn enclosure.

Biomass is introduced into the pyrolysis unit and pyrolysized by the generally-deoxygenated, combusted gas streams, resulting in the creation of primarily non-condensing gases (NCG) and pyrolysis oil vapor, along with entrained carbon (char). This exhaust and its entrained matter are collected from the pyrolysis unit and directed to other parts of the system where the pyrolysis oil vapor and char are separated from the NCG and collected.

In some embodiments, a cyclone separator is used to separate entrained char from the exhaust. In some embodiments a biomass feed bin is used for introduction of biomass into the pyrolysis unit. In some embodiments, NCG separated from its pyrolysis oil vapor and char is passed through the biomass feed bin whereupon the biomass acts as a filter, cleaning remaining entrained matter from the exhaust. Char separated from the exhaust can be introduced back into the pyrolysis unit to aid in producing the generally-deoxygenated heated gas stream. In some embodiments, NCG is used as the entraining gas in addition to the combustion gas. In yet another embodiment, the exhaust from a gas turbine is used as a heat source to promote an efficient fast pyrolysis.

Specific improvements in the pyrolysis systems, apparatus and methods described in the above-identified related applications, the contents of which are incorporated here by reference, include the addition of a hot gas filter (HGF) system and a method for removing char from the pyrolysis vapors and non condensing gases prior to cooling and condensing of the pyrolysis vapors into pyrolysis-oil; an apparatus and methods for cleaning the hot gas filter elements in place during operation of the pyrolytic system; a Dual Entrainment Rotary Valve (DERV) system and method; an apparatus and method for removing the pyrolysis oil mist from the non-condensing gas stream comprising of a Dynamic Demister; a set of disposable filter elements; and a draft filter system which employs biomass as its filtrate.

The HGF system addresses a problem of char being entrained with the pyrolysis oil vapors following removal of the larger char particles by the cyclone filter. It is known that oil produced via pyrolysis that contains char is not desired, as the char continues to react with the pyrolysis oil forming longer chain molecules and a general increase in the viscosity of the pyrolysis oil. Removing the char particles above 2 to 3 microns reduces these degrading effects and provides oil with an extended shelf life. Removal of the char must be accomplished prior to condensing of the pyrolysis vapors into pyrolysis oil. Specifically, the char is preferably filtered using a hot gas filter. It is also known in the filtering industry to remove micron and submicron particles of char at elevated temperatures. These filters are expensive to purchase and operate. A unique hot gas filter, (HGF) has been developed and is integrated with the cyclone separator as an exit filter that is economical to fabricate and operate. It is also noted that integration of the cyclone and the HGF system reduces the number of and space required for those machine centers. To ensure that the char is filtered at the required temperature, the air pre heater of the cyclone is removed and insulation to the outer walls of the cyclone is installed.

Hot gas filters experience build up of the filtered material on the surface of the filter elements referred to as a cake. This build up of material has the positive effect of decreasing the size of the particle that is allowed to pass through the filter element but the negative result of increasing the pressure required for the gas to flow. This increase in pressure is reflected throughout the pyrolysis unit, increasing the power to operate the unit and the pressure capabilities of the unit. As the pressure increases a point is reached where the filter elements must be cleaned or replaced. The filter industry relies on a procedure of back flow of a compatible gas through the filter elements to crack or fracture the cake causing it to fall from the filter element. This procedure is incompatible with the pyrolysis system, potentially introducing pressure and thermal shock waves; furthermore the back flow technique does completely clean the filter elements of the cake. The partial cleaning results in a shorter run time between the back flow cleaning cycles reducing the production rate of the pyrolysis system. As the run time becomes too short, the filter elements must be removed for cleaning or replacement. A significant aspect of this invention is the apparatus and methods for cleaning the filter elements while installed to provide complete removal of the char, returning the elements to a clean condition. Upon reaching a certain pressure drop across the filter elements, the biomass feed to the pyrolysis unit is stopped or reduced while the oxygen supplied to the system is increased via an increase in the combustion air flow. This oxygen rich gas stream causes the char caked on the filter elements to ignite and burn, forming carbon dioxide which flows through the filter elements and into the exhaust system. Combustion air flow is controlled to prevent overheating of the filter elements and system. The pyrolysis unit is then returned to the pyrolysis operation when the pressure drop across the filter elements drops below a desired value.

Another significant aspect of this invention is the DERV, providing sealing surfaces to prevent or minimize the flow of gas between the inlet and outlet, thereby restricting the flow of gas from the higher pressure pyrolysis unit to the lower pressure biomass in-feed sub-system. Preferably, the biomass is delivered to the DERV by an auger running at atmospheric pressure, with entrainment of the biomass at the DERV biomass inlet utilizing a vacuum source and a supply of NCG. The biomass flows into and through the chambers of the DERV that are in alignment with the DERV biomass inlet where a portion of the flowing biomass is captured by the moving chambers and is thereafter presented to the DERV biomass outlet by the rotation of the cylinder and transferred via entrainment to the pyrolytic unit by NCG flowing through the chamber aligned with the DERV biomass outlet. An alternative embodiment employees screens at the exit end of each of the cylinder chambers preventing the biomass from flowing through the chamber. The amount of biomass so fed is a function of the biomass density being supplied to the biomass inlet of the DERV via the action of the vacuum and the entraining NCG. The rate of delivery of biomass to the pyrolysis unit is a function of the biomass inlet density as well as the rotational rate of the cylinder in the DERV. Floating seals under spring pressure, or alternatively under hydraulic pressure ensure that the chambers are sealed between biomass inlet and biomass exit, further facilitating the flow of biomass into the pyrolytic unit. In an alternative embodiment, the axis of rotation of the cylinder can be vertical whereby the biomass inlet flow and biomass exit flows are a result of or are facilitated by gravity.

The improved system, apparatus and methods also employ three systems and methods to remove pyrolysis oil mist from the NCG. It is known that pyrolysis oil forms submicron particles or mist during condensing with the individual droplets having no coalescing affinity. The mist represents a loss in pyrolysis oil production but an even greater problem for an entrainment system whereby the entraining gas is a portion of the NCG produced by the pyrolysis unit. The dynamic demister is a fan wheel rotating at a high rate that is in the path of the NCG following collection of the pyrolysis oil. The NCG and entrained pyrolysis oil mist are accelerated to a high centrifugal velocity whereby coalescing of the pyrolysis oil mist is achieved.

The NCG next passes through a plurality of disposable filter elements that provide an economical ten micro filter system that is easy to replace. The NCG then flows into a draft filter employing biomass as the filtrate. The biomass filtrate is returned to the system and mixed with clean biomass for pyrolysis upon completion of its usage as a filtrate.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 14 is a partially transparent projection view of the integrated cyclone hot gas filter, the economizer and the condenser.

FIG. 20 is a flow diagram of the steps taken by the programmable process controller.

DETAILED DESCRIPTION

Figure 1:
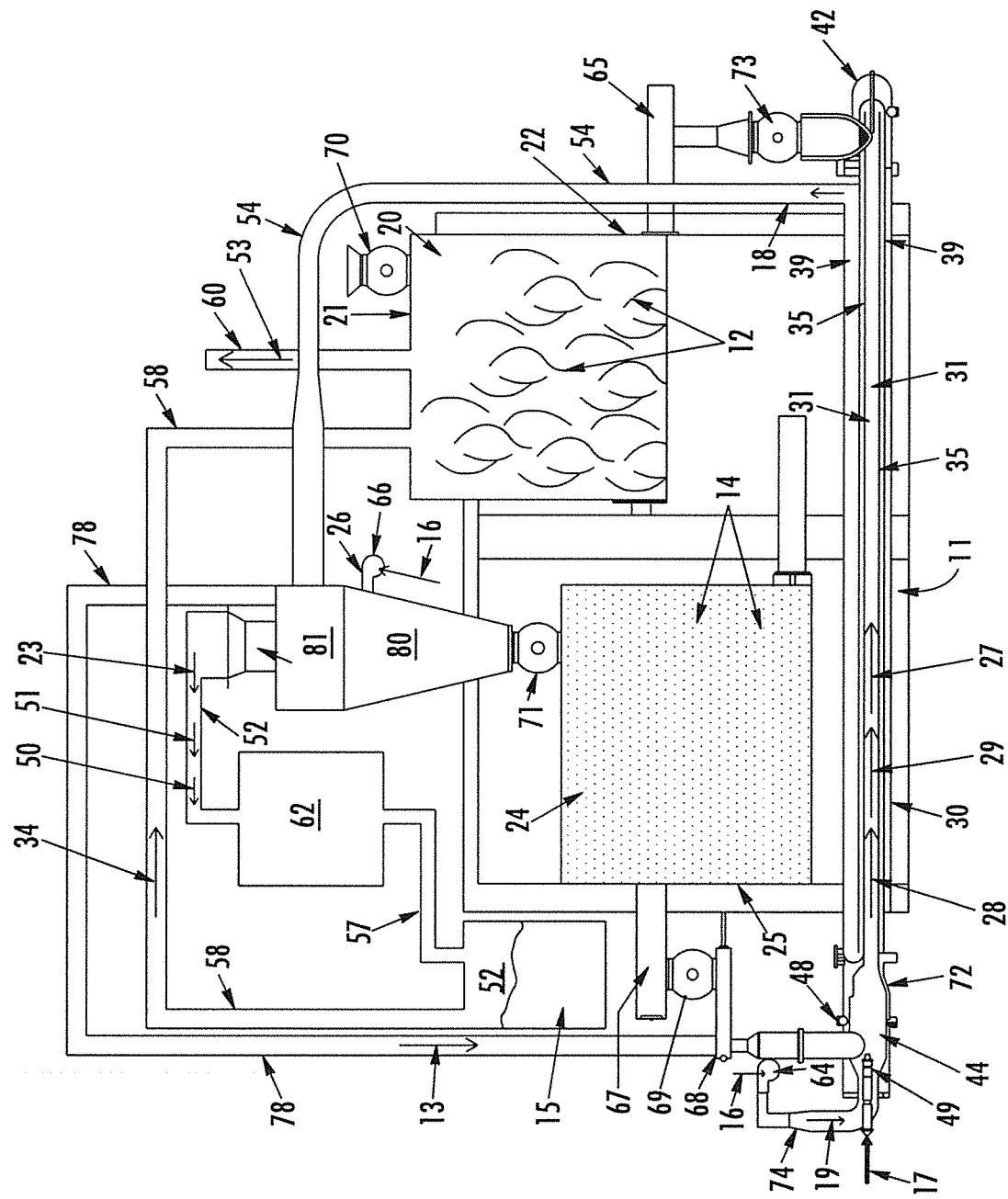
FIG. 1 is a schematic view, partially in cross section, of a first embodiment of a pyrolysis system in accord with the present invention.

A first embodiment of a fast pyrolysis system in accordance with this invention is depicted in FIGS. 1-4 and designated generally by reference numeral 10.

Referring now to FIG. 1, the system 10 comprises a biomass feed bin 20 for receiving and delivering biomass 12 into a pyrolysis unit 30, described in detail below. The biomass feed bin 20 is enclosed to provide greater control over the channeling of exhaust 34 (shown as an arrow) from pyrolytic reactions that is fed into the feed bin 20. The biomass 12 is fed through a top 21 of the feed bin 20 using rotary air lock 70. The biomass 12 is delivered into the pyrolysis unit 30 from the feed bin 20 by an auger 65 attached to a lower portion 22 of the biomass feed bin 20. In this way, the biomass feed bin 20 continually feeds new biomass 12 through the system 10 into the unit 30.

With continued reference to FIG. 1, the biomass feed bin 20 accepts raw biomass 12. The present embodiment envisions receiving this biomass 12 primarily from sawmills, particularly CNS facilities. The biomass 12 will typically not need to be ground to a smaller size because it will already be of a size suitable for use in the system 10. If the biomass 12 does need to be ground, however, the biomass 12 will be ground prior to placing the biomass 12 in the biomass feed bin 20. Note that in the present embodiment, an optimal size for particles of biomass 12 used in the concentric-chambered pyrolysis system 10 are envisioned to be particles having no side generally greater than one-quarter inch in length. In alternate embodiments, however, items of biomass 12 having substantially larger dimensions may be used. Note also that in the present embodiment, items of biomass 12 are envisioned to consist generally of wood chips, sawdust, bark, wood shavings, and the like. Note further that in alternate embodiments, the use of biomass 12 of varying types received from numerous different sources may be used. These can include environmentally problematic materials such as waste paper and ground tire rubber.

Still referring to FIG. 1, some biomass 12 fed into the system 10 might require drying prior to undergoing pyrolysis. Biomass 12 with a moisture content of approximately fifteen percent or less by weight can typically be subjected to pyrolysis without prior drying. Green biomass 12, however, will generally have a moisture content of about fifty percent by weight, as opposed to dry biomass 12 that generally will have a moisture content of about ten percent. The green biomass 12 can be blended with the drier biomass 12 to achieve a combined moisture content of fifteen percent or less. If such blending of the biomass 12 is insufficient to achieve a fifteen percent moisture content by weight, then the biomass 12 will need to be dried prior to subjecting the biomass 12 to pyrolysis. Optimally, the biomass 12 subjected to pyrolysis will have a moisture content of no more than twelve percent by weight. In some cases the biomass 12 may be too dry, in which case moisture can be added.

Figure 2:
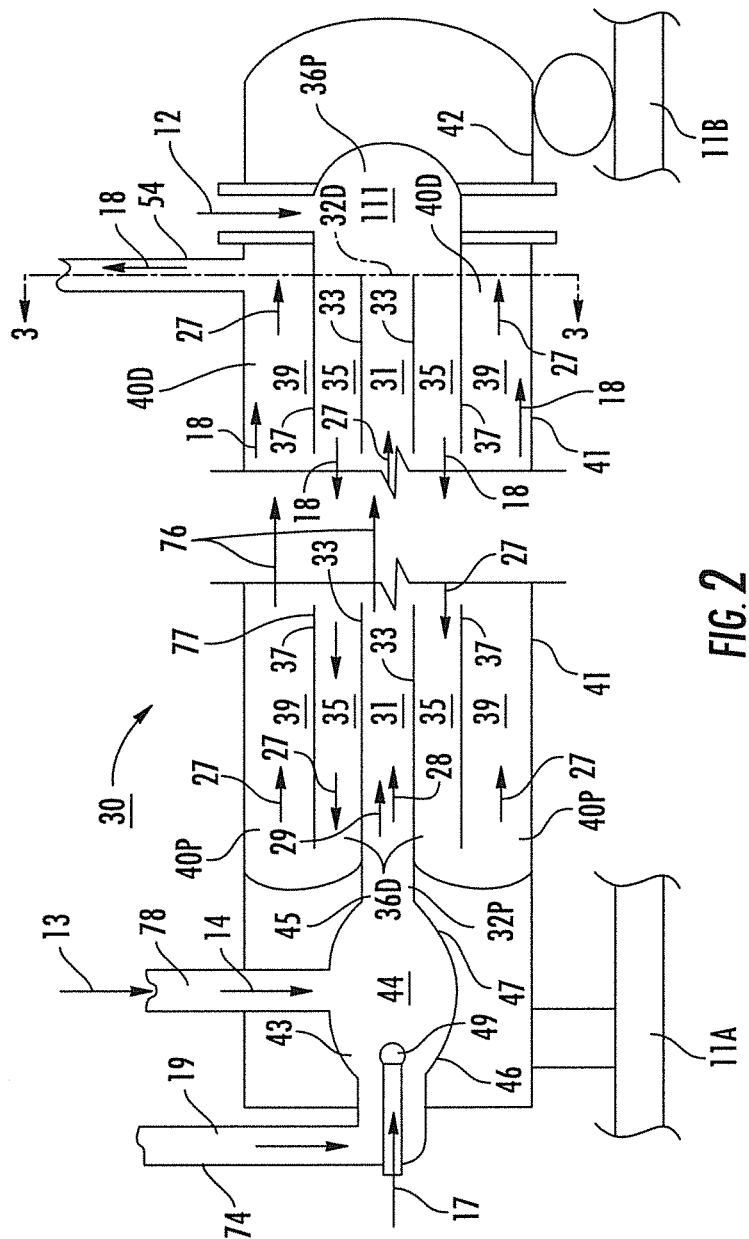
FIG. 2 is a partial schematic sectional view of the concentric chamber pyrolysis unit employed in the embodiment of FIG. 1.

Referring now to FIGS. 1 and 2, the system 10 includes a pyrolysis unit 30. As specifically shown in FIG. 2, the pyrolysis unit 30 includes a burn enclosure 44, an igniter 49, a combustion chamber 31, an inner pyrolysis chamber 35, and an outer pyrolysis chamber 39. The burn enclosure 44 is in the general shape of an elongated tube open at opposing ends 43 and 45. A fuel-air input duct 74 is attached to the end 43 of a forward portion 46 of the burn enclosure 44, while the igniter 49 is attached proximate to the end 43 of the forward portion 46. Insulation 72 (see FIG. 1) is installed around the burn enclosure 44 to reduce the amount of heat lost to the surrounding environment.

Continuing with FIG. 2, the combustion chamber 31, the inner pyrolysis chamber 35 and the outer pyrolysis chamber 39 are each also in the general shape of an elongated tube, with the three chambers 31, 35, 39 arranged generally concentrically. The combustion chamber 31 is innermost, the inner pyrolysis chamber 35 surrounds the combustion chamber 31, and the outer pyrolysis chamber 39 is outermost, surrounding both the combustion chamber 31 and the inner pyrolysis chamber 35. An end 45 of a rearward portion 47 of the burn enclosure 44 is connected to a proximate end 32P of the combustion chamber 31, while an opposing distal end 32D of the combustion chamber 31 extends into but is not attached to a proximate end 36P of the inner pyrolysis chamber 35. An opposing distal end 36D of the inner pyrolysis chamber 35 extends into but is not attached to a proximate end 40P of the outer pyrolysis chamber 39. This cantilevered design allows each of the chambers to increase in length when operating at pyrolysis temperatures without binding or interference. As shown in FIG. 2, the burn enclosure 44 is anchored to the support structure 11A while the pyrolysis unit 30 is cradled by the support structure 11B; this allows an increase in length based on the operating temperatures of the unit 30. One inch of increase in length between cold and operating temperature is typical for a pyrolysis unit twelve feet in length.

Note that in alternate embodiments, it is possible for a pyrolysis unit 30 to comprise as few as two chambers, for example a combustion chamber 31 and a single pyrolysis chamber 35. In other alternate embodiments, it is possible that a pyrolysis unit 30 will have additional chambers, for example chambers in addition to a combustion chamber 31, an inner pyrolysis chamber 35, and an outer pyrolysis chamber 39. The chambers of a pyrolysis unit can also be arranged in a generally eccentric configuration, as opposed to a generally concentric configuration.

Figure 3:
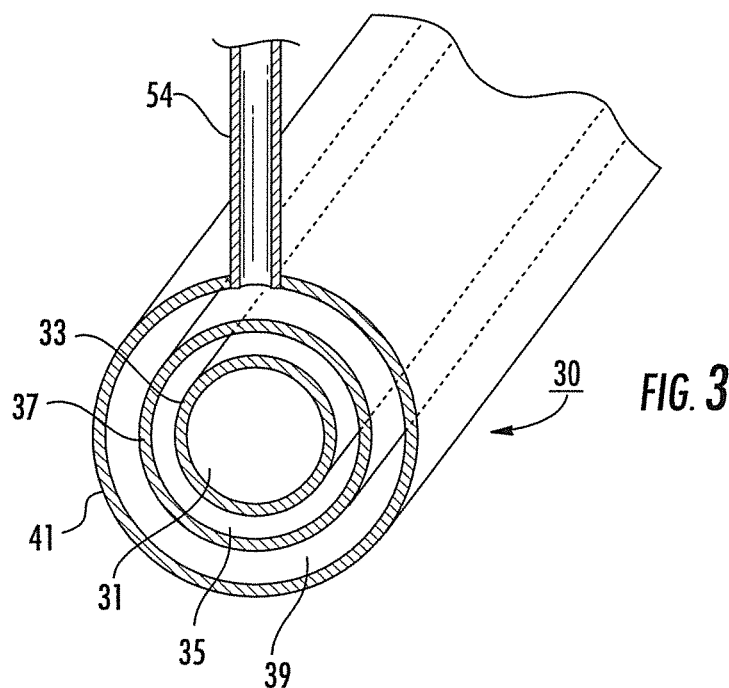
FIG. 3 is a cross-sectional perspective view of FIG. 2, taken along line 3-3.

Referring now to FIG. 3, each of the three chambers 31, 35, 39 of the pyrolysis unit 30 shares a wall 33, 37 with one other chamber 31, 35, 39. A common wall 33 forms the wall of the combustion chamber 31 as well as the inner wall 33 of the inner pyrolysis chamber 35. Another common wall 37 forms the outer wall of the inner pyrolysis chamber 35 and also the inner wall 37 of the outer pyrolysis chamber 39. In this way, the three chambers 31, 35, 39 all function as heat exchangers, promoting heat transfer in three ways. First, conductive heat is transferred through the common walls 33, 37 of the chambers 31, 35, 39. Second, concurrent flow heat is transferred by the high thermal energy gas stream 27 (shown as arrows in FIG. 2) and char 14 to the biomass undergoing pyrolysis, as described below with reference to FIGS. 1 and 2. Third, countercurrent flow heat is transferred by the gas stream 28, 29 flowing throughout the chambers 31, 35, 39. Insulation 72 (see FIG. 1) is installed adjacent an interior surface 42 (see FIG. 2) of an outer wall 41 of the pyrolysis unit 30 to reduce the amount of heat lost to the surrounding environment. The generally concentric configuration of the pyrolysis unit 30 allows for reuse of heat that would otherwise be lost to the surrounding environment.

Referring again to FIG. 1, blower 64 draws outside air 16 (shown as an arrow) delivering pressurized fuel-air 19 (shown as an arrow), and delivers it into the burn enclosure 44 through the fuel-air input duct 74. Fuel 17 (shown as an arrow) is also delivered under pressure to the fuel-air input duct 74 where the air 19 and fuel 17 are mixed. Combustion of the fuel-air mixture 17, 19 produces heat and removes oxygen from the burn enclosure 44 and the attached combustion chamber 31 forming the substantially deoxygenated, continuous heated gas stream 28. A variety of fuels 17 can be delivered from fuel storage unit 15 for this purpose, such as fuel oil, natural gas, LP gas, or bio-oil.

Continuing with FIG. 1, the blower 66 draws in outside air 16 and delivers pressurized air 26 (shown as an arrow) to the preheater duct 83; the preheated air 13 (shown as an arrow) exits the preheater duct 83 and enters the char-air input duct 78. The air 16 need not be preheated; however, preheating the air improves the thermal efficiency of the process. The char 14 is fed from a char bin 24 by a first auger 67 attached to a middle portion 25 of the char bin 24. The first auger 67 conveys the char 14 out of the char bin 24 and into a proximate rotary air lock 69. A second auger 68 receives the char 14 from the rotary air lock 69 and delivers the char 14 into a char-air input duct 78 that leads into the burn enclosure 44. The preheated air 13 comes from a cooling duct 83 (see FIG. 4) of a cyclone separator 80 that is used to separate entrained char 14 from the exhaust 18 (shown as an arrow) of previous pyrolytic reactions, as described below with reference to FIG. 4. The cooling duct 83 connects to the char-air input duct 78 to convey the preheated air 13 to the burn enclosure 44. An end of the char-air input duct 78 is attached to a top 48 of the burn enclosure 44. The char-air mixture 14, 13 exits the end of the duct 78 and enters the burn enclosure 44 through the top 48. Combustion of the char-air mixture 14, 13 produces heat and removes oxygen from the burn enclosure 44 and the combustion chamber 31 forming the substantially deoxygenated, continuous heated gas stream 29 (shown as an arrow). A key function of the char-air mixture 14, 13 is to burn off any excess oxygen otherwise remaining in the burn enclosure 44 and combustion chamber 31 following combustion of the fuel-air mixture 17, 19.

Referring now to FIGS. 1 and 2, the igniter 49 ignites the fuel-air mixture 17, 19. The ignited fuel-air mixture 17, 19 in turn, ignites the char-air mixture 14, 13. Combustion begins generally in the burn enclosure 44 and continues into the combustion chamber 31 where the mixtures 17, 19 and 14, 13 are substantially fully combusted. Although it is preferable that all of the oxygen remaining in the burn enclosure 44 and combustion chamber 31 be consumed, it is not required. Feeding of the mixtures 17, 19 and 14, 13 along with ignition of the mixtures, is done in a continual sequence during operation of the system 10.

Continuing with FIG. 1, to burn off any excess oxygen that would otherwise remain in the burn enclosure 44 and combustion chamber 31 following ignition of the fuel-air mixture 17, 19, and the char-air mixture 14,13 requires that a certain minimum amount of char 14 be present in the burn enclosure 44. During typical operation of the system 10, however, more than this minimum amount of char 14 is introduced into the burn enclosure 44. This results in excess char 14 being present in the combustion chamber 31 following combustion of the mixtures 17, 19 and 14, 13. The particles of excess char 14 radiate heat to their surroundings as the char 14 travels through the chambers 31, 35 and 39. Eventually, the excess char 14 becomes entrained within exhaust 18 from a new pyrolysis reaction, with the excess char 14 mixing with newly-pyrolysized char 14, as described below with reference to FIGS. 1 and 2. In an alternate embodiment described with reference to FIG. 6, a gas turbine is used as a combustion source for providing heat and deoxygenating action in addition to or in place of a burn enclosure 44.

Referring now to FIG. 2, the substantially deoxygenated, continuously heated gas streams 28, 29 produced from the continual combustion of the mixtures 17, 19 and 14, 13 (see FIG. 1) flows out of the rearward portion 47 of the burn enclosure 44 and throughout the combustion chamber 31, mixing and forming a high thermal energy gas stream 27 (shown as arrows). The continual production of the heated gas streams 28 and 29 from the burn enclosure 44 and the combustion chamber 31, together with an impetus provided by injection of the fuel-air mixture 17, 19 and the char-air mixture 14, 13 into the burn enclosure 44 under pressure, propels the high thermal energy gas stream 27 in a first direction 76 through the combustion chamber 31 and into the inner pyrolysis chamber 35, where the high thermal energy gas stream 27 is channeled into a second direction 77 that is opposite to that of the first direction 76 of the high thermal energy gas stream 27 through the combustion chamber 31. The high thermal energy gas stream 27 exits the distal end 36D of the inner pyrolysis chamber 35 and enters the proximal end 40P of the outer pyrolysis chamber 39. In the outer pyrolysis chamber 39, the high thermal energy gas stream 27 is directed back to the first direction 76 which is opposite to that of the second direction 77 through the inner pyrolysis chamber 35.

Continuing with FIG. 2, in addition to heat radiating from the flow of the high thermal energy gas stream 27 through the pyrolysis unit 30, heat from the high thermal energy gas stream 27 is also conducted along the three generally concentric chambers 31, 35, 39 through the common walls 33, 37 of the three chambers 31, 35, 39. In this way, each of the chambers 31, 35, 39 operates as a countercurrent flow heat exchanger. Note that the temperature of the combustion chamber 31 during operation of the system 10 is typically in excess of six-hundred-fifty degrees Celsius.

Referring now to FIGS. 1 and 2, biomass 12 is fed from the biomass feed bin 20 by the auger 65 attached to the lower portion 22 of the biomass feed bin 20. The auger 65 conveys the biomass 12 out of the feed bin 20 and into a proximate rotary air lock 73. The rotary air lock 73, in turn, introduces the biomass 12 into the pyrolysis unit 30 at the distal end 32D of the combustion chamber 31, where the combustion chamber 31 is in communication with the proximate end 36P of the inner pyrolysis chamber 35.

The high thermal energy gas stream 27 (shown as arrows in FIG. 2) captures the biomass 12 in its flow and carries the biomass 12 along through the inner pyrolysis chamber 35 toward the distal end 36D of the inner pyrolysis chamber 35, opposite the proximate end 36P where the biomass 12 entered. As the high thermal energy gas stream 27 moves the biomass 12 along, thermal energy is transferred from the high thermal energy gas stream 27 to the biomass 12 and rapidly pyrolysizes the biomass 12 forming pyrolysis oil vapors 51, char 14, and non condensing gas 50. Optimally, pyrolysis of the entrained biomass 12 takes no more than two seconds. Exhaust 18 (shown as an arrow) resulting from the pyrolytic reaction comprises primarily non-condensing gases 50, pyrolysis-oil vapor 51, and char 14 that are all entrained by the high thermal energy gas stream 27 (see FIG. 1). Note that the non-condensing gases 50 are substantially made up of carbon dioxide, carbon monoxide, and nitrogen. The char 14 includes excess, non-combusted char 14 from the char-air mixture 14, 19 that was introduced into the burn enclosure 44, as described above. In alternate embodiments, various forms of inert material can be employed to assist in the transfer of heat to the biomass that is to be pyrolysized. These inert materials may be recovered by a cyclone filter 80 for reuse in the continuous pyrolysis process as described below with reference to FIG. 4.

Still referring to FIGS. 1 and 2, the exhaust 18 from the pyrolytic reaction, along with any remaining non-pyrolysized biomass 12, reaches the distal end 36D of the inner pyrolysis chamber 35, where the inner pyrolysis chamber 35 communicates with the proximate end 40P of the outer pyrolysis chamber 39. As the exhaust 18 and remaining biomass 12 enter the outer pyrolysis chamber 39, the exhaust 18 and remaining biomass 12 flow in the first direction opposite to that of the second direction. As the remaining non-pyrolysized biomass 12 is swept through the outer pyrolysis chamber 39, it is further pyrolysized by heat from the high thermal energy gas stream 27. Exhaust 18 from this pyrolytic reaction combines with the existing exhaust 18 in the outer pyrolysis chamber 39. In some instances it is possible that a small quantity of oxygen will remain in one or both of the pyrolysis chambers 35, 39 at the time of pyrolysis. In this event, a small amount of the biomass 12 will combust with the oxygen rather than pyrolysize, thereby yielding additional thermal energy for pyrolysis of the biomass.

Continuing with FIGS. 1 and 2, an exhaust duct 54 is fitted to the pyrolysis unit 30 proximate the distal end 40D of the outer pyrolysis chamber 39, opposite the proximate end 40P of the outer pyrolysis chamber 39 where the outer pyrolysis chamber 39 communicates with the inner pyrolysis chamber 35. The exhaust 18 exits the outer pyrolysis chamber 39 and rises along the exhaust duct 54. The exhaust duct 54 leads from the pyrolysis unit 30 and attaches to the cyclone separator 80, as described next with reference to FIG. 4.

Figure 4:
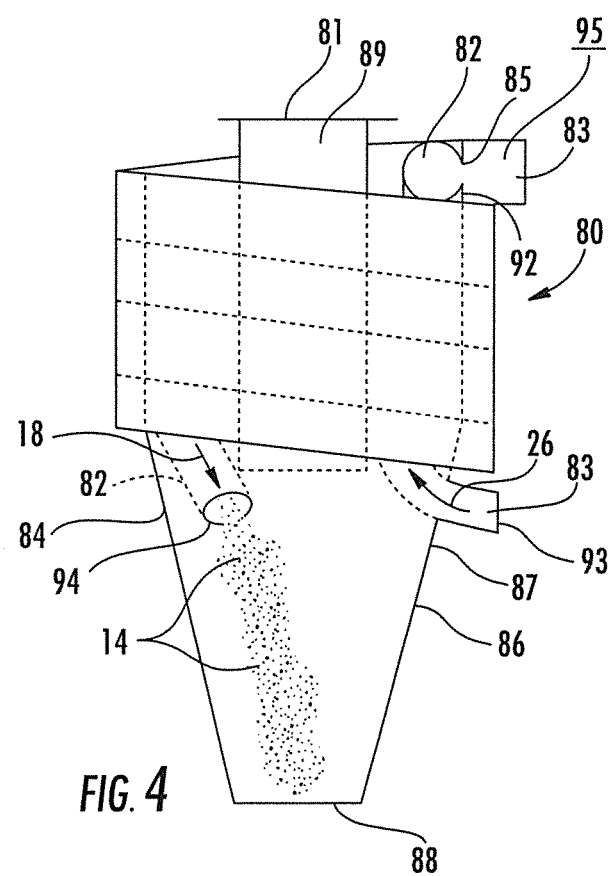
FIG. 4 is a schematic view of a cyclone separator with integrated pre heater used in the embodiment of FIG. 1.

Referring now to FIG. 4, the cyclone separator 80 comprises a body 84 with a collection cone portion 86, a central exhaust pipe 81, an inflow pipe 82, and a cooling duct 83. The collection cone portion 86 is in the general shape of a cone having an upwardly facing mouth 87 and an opposing open end 88 for collecting and distributing char 14 that has been separated from the exhaust 18 (shown as an arrow). The exhaust pipe 81 resides in the approximate center of the body 84 with the collection cone portion 86 located beneath a lower end of the exhaust pipe 81. The exhaust pipe 81 is used for carrying the pyrolysis oil vapors 51 and the non condensing gas 50 out of the cyclone separator 80 following separation of the entrained char 14 from the exhaust 18. The inflow pipe 82 and cooling duct 83 are aligned parallel with each other and share a common wall 85, forming a closed heat exchanger with the inflow pipe 82 located inwardly of the cooling duct 83. The common wall 85 promotes heat transfer from the exhaust 18 in the inflow pipe 82 to the pressurized air 26 in the duct 83. The inflow pipe 82 and cooling duct 83 spiral downwardly together around the central exhaust pipe 81, beginning near an upper portion 89 of the exhaust pipe 81 and descending to a point just above the mouth 87 of the collection cone portion 86.

Continuing with FIGS. 1 and 4, the exhaust duct 54 connects to an end 92 of the inflow pipe 82 that is near the upper portion 89 of the central exhaust pipe 81. The cyclone separator 80 draws the exhaust 18 downwardly through the inflow pipe 82 toward the mouth 87 of the collection cone portion 86. A blower 66 is attached to an end 93 of the cooling duct 83 that is near the mouth 87 of the collection cone portion 86. The blower 66 forces outside air 16 (shown as an arrow) upwardly through the cooling duct 83. The cooler pressurized air 26 flows through the cooling duct 83, absorbing some of the heat of the hotter exhaust 18 inside the inflow pipe 82 through the common wall 85 between the inflow pipe 82 and the cooling duct 83, thereby heating the air 26 and cooling the exhaust 18. The char-air input duct 78 connects to an opposing end 94 of the cooling duct 83 that is near the upper portion 89 of the exhaust pipe 81. The now-heated air 13 flows through the char-air input duct 78 until the heated air 13 is eventually vented into the burn enclosure 44 along with the char 14 to be combusted. In alternate embodiments, preheated air 13 from a cooling duct 83 is routed to a fuel-air input duct 74 or to both a char-air input duct 78 and a fuel-air input duct 74 thereby heating the char air and the fuel air mixtures.

Still referring to FIGS. 1 and 4, as the exhaust 18 spirals downwardly through the inflow pipe 82 toward the mouth 87 of the collection cone portion 86, centrifugal force drives the particles of char 14 entrained within the exhaust 18 toward the common wall 85 between the inflow pipe 82 and the cooling duct 83. As the particles of char 14 exit the end of the inflow pipe 82, the char 14 falls into the mouth 87 of the collection cone portion 86 and exits the open end 88 of the collection cone portion 86. Connected to the open end 88 is a rotary air lock 71. The rotary air lock 71 feeds the char 14 into the char bin 24. A given amount of the char 14 from the char bin 24 will be fed into the burn enclosure 44. Since the char bin 24 is continually filling with char 14 from the cyclone separator 80, char 14 is removed from the char bin 24 to keep the char bin 24 from overflowing. This excess char 14 is removed as an end product of the system 10. At this point, substantially all of the char 14 will have been removed from the exhaust 18. The substantially char-free exhaust 23 (shown as an arrow in FIG. 1) now principally comprises non-condensing gases 50 and pyrolysis oil vapor 51. This generally char-free exhaust 23 flowing from the end of the inflow pipe 82 rises and exits the cyclone separator 80 through an end of the upper portion 89 of the central exhaust pipe 81 and enters a second exhaust duct 56 attached to the end of the upper portion 89. The exhaust duct 56 transports the exhaust 23 (shown as an arrow) through a condensing system 62 that cools the exhaust 23 to a temperature on the order of below about one-hundred degrees Celsius. At this temperature, substantially all of the pyrolysis oil vapor condenses out of the exhaust 23 while the non-condensing gases in the exhaust 23 remain in a gaseous state 50. The exhaust duct 57 leads from the bio-oil condensing system 62 to a bio-oil storage tank 52. The now-liquid bio-oil 15 and the substantially bio-oil-free exhaust 50 empty into the bio-oil storage tank 52. The liquid bio-oil 15 collects in the storage tank 52 and is dispensed from the tank 52 as an end product of the system 10.

Continuing with FIG. 1, a fourth exhaust duct 58 leads from the bio-oil storage tank 52 to the biomass feed bin 20. The biomass feed bin 20 is generally enclosed to provide greater control over the channeling of the exhaust 34 fed into the feed bin 20, as described above. The exhaust 34 leaves the exhaust duct 58 and passes through the biomass feed bin 20. The biomass 12 in the feed bin 20 acts as a filter for the exhaust 34, filtering out of the exhaust 34 any entrained liquid or solid matter. The filtered non-condensing gases 53 then exit the biomass feed bin 20 through an exhaust vent 60 leading to the outer environment. In alternate embodiments, a diverter is attached between the char-air input duct 78 and the exhaust duct 60 to channel a portion of the filtered non-condensing gases 53 exiting the biomass feed bin 20 into the burn enclosure 44 to join char 14 that is to be combusted, as described above with reference to FIG. 1.

As shown in FIG. 1, the system 10 is preferably mounted within a framework of vertical and horizontal structural members 11 which permit the system 10 to be easily mounted on a truck bed, upon a skid or on wheels so as to be easily transported from one biomass source to another as circumstances dictate. In a preferred form, the footprint of the system 10 is such that one or more systems may be mounted upon a flat bed truck, it being understood that two or more systems 10 may be required to handle the biomass output from a large sawmill, such as a CNS facility.

Figure 5:
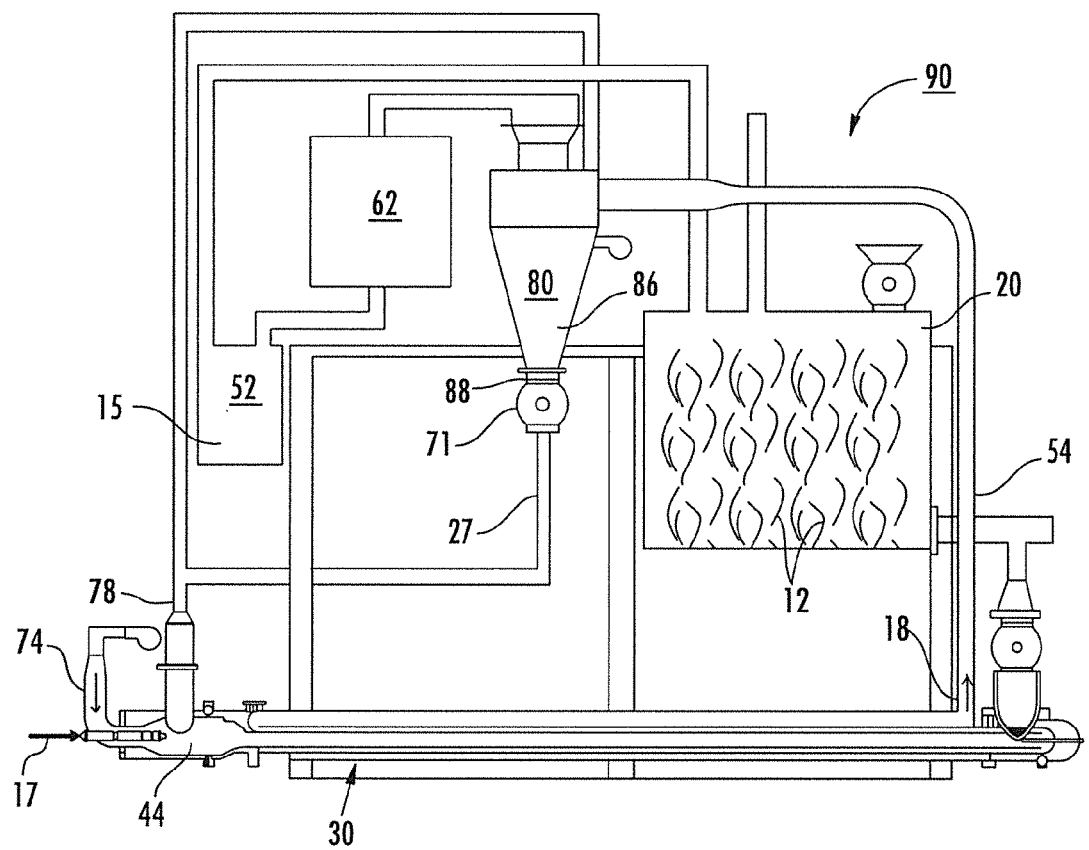
FIG. 5 is a schematic view of a second embodiment of a concentric chamber pyrolysis system in accord with the present invention.

FIG. 5, together with FIG. 4, depicts a second embodiment of a concentric chamber pyrolysis system, designated generally by reference numeral 90, in accordance with the present invention. In the FIG. 5 embodiment, substantially the entire amount of char 14 produced from pyrolytic reactions in a pyrolysis unit 30 is fed back into the system 90 to help fuel further pyrolytic reactions. As particles of char 14 exit the open end 88 of the collection cone portion 86 of the cyclone separator 80, the char 14 enters rotary air lock 71 attached to the open end 88 of the separator 80. The rotary air lock 71 feeds the char 14 directly into a char feed duct 27. The char feed duct 27 leads to a char-air input duct 78. The char-air input duct 78, in turn, feeds the char into the burn enclosure 44 of the pyrolysis unit 30. In this way, virtually all of the char 14 produced from pyrolysized biomass 12 is fed back into the system 90 and used to power further fast pyrolytic reactions. Additional fuel 17 (shown as an arrow in FIG. 5), is added to the burn enclosure 44 as needed to ensure the system 90 continues to effect efficient fast pyrolytic reactions. Regarding FIG. 5, note that unlike the concentric-chambered pyrolysis system 10 of the first embodiment shown in FIGS. 1-4, the system 90 does not require a char bin 24, the augers 67, and 68 nor the rotary valve 69 to convey char 14 from the char bin 24 to the char-air input duct 78.

Figure 6:
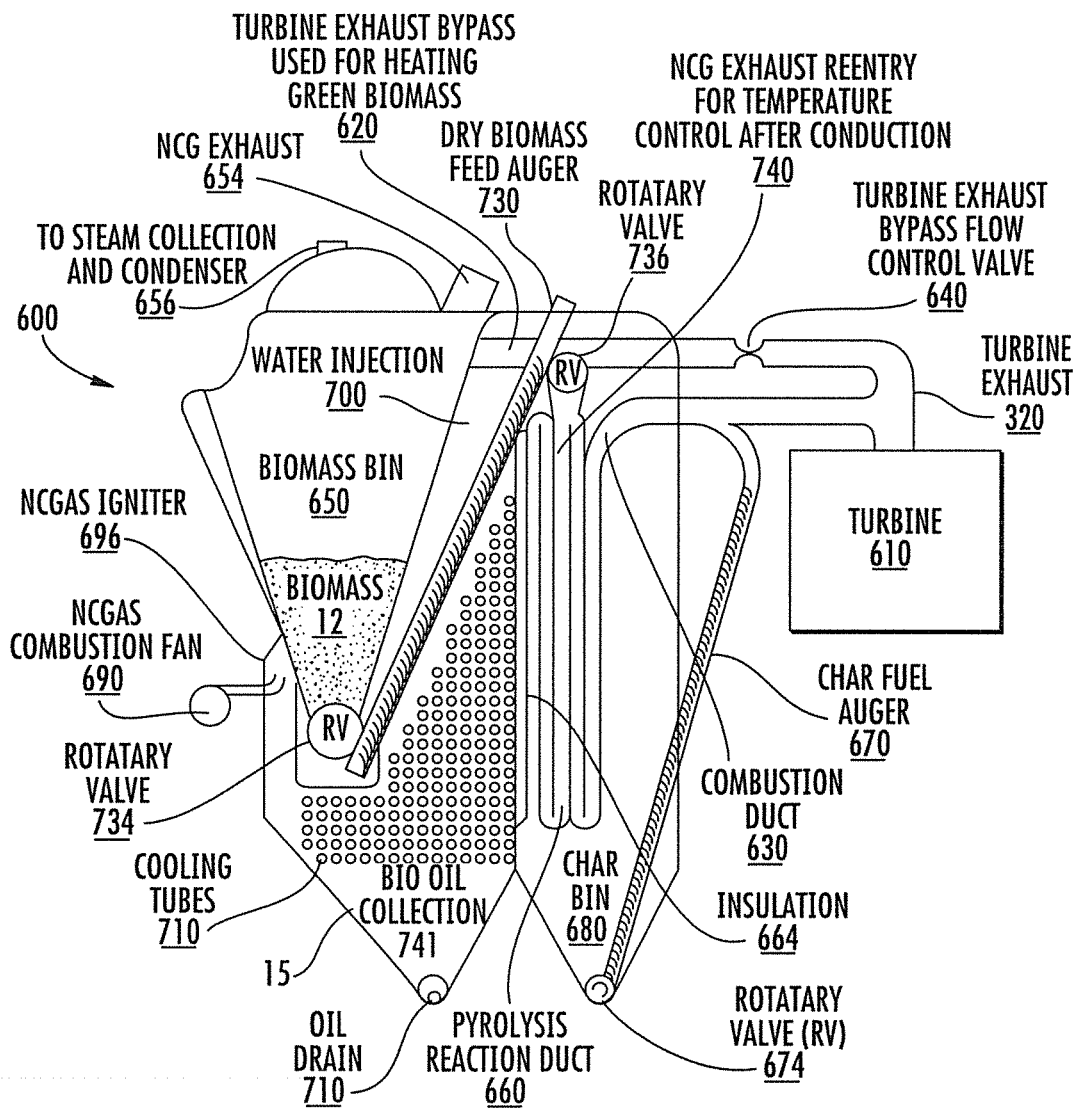
FIG. 6 is a third embodiment of a fast pyrolysis system in accordance with the present invention.

FIGS. 6-9 illustrate schematically and as flow diagrams a third embodiment 600 of a system and apparatus using fast pyrolysis to produce energy products 210 from biomass 12, such as the waste or byproducts produced at a CNS facility. Referring to FIG. 6, a turbine 610 produces exhaust 320 during its operation. A turbine exhaust bypass duct 620 channels a portion of this exhaust 320 through a turbine exhaust bypass flow control valve 640 to a biomass bin 650. The flow control valve 640 controls the amount of exhaust 320 flowing from the turbine 610 to the bin 650. The control valve 640 is adjusted to allow only as much exhaust 320 to enter the bin 650 as is needed to dry and heat the biomass 12 to the desired moisture content and temperature. A combustion duct 630 channels the remainder of the exhaust 320 from the turbine 610 to a pyrolysis reaction duct 660. As fast pyrolysis reduces a portion of the biomass input 12 to char 270, the char 270 (FIG. 9) drops from the pyrolysis reaction duct 660 into a char bin 680. A char fuel auger 670 is connected to the char bin 680 on one end and to the combustion duct 630 on the other end. A rotary valve 674 resides between the char bin 680 and the fuel auger 670. The rotary valve 674 accepts char 270 from the char bin 680 and feeds it to the char fuel auger 670. The fuel auger 670 then draws the char 270 up into the combustion duct 630 and into the hot exhaust stream 320. The hot exhaust 320 is typically on the order of five-hundred degrees Fahrenheit or greater at this point. The exhaust 320 also contains approximately fifteen percent oxygen. When char 270 is fed into the exhaust stream 320 by the fuel auger 670, the char 270 is combusted. The combustion of the char 270 burns off the remaining oxygen in the hot exhaust stream 320 and raises the temperature of the exhaust stream 320. Other types of fuel can be used here as well. An advantage to using char 270 as a fuel here, however, is that the char 270 does not produce smoke and any excess char is simply recollected in the char bin 680. Despite the type of fuel used, the objective is to remove the oxygen from the exhaust 320. It should be recognized that methods other than combustion can be used to remove the oxygen from the exhaust 320. The exhaust stream 320 then continues down the combustion duct 630 and into the pyrolysis reaction duct 660.

Returning now to FIG. 6, the turbine exhaust bypass duct 620, exhaust 320 channels down the bypass duct 620 and arrives at the biomass bin 650. The biomass bin 650 receives raw biomass 12 destined for the pyrolysis reaction duct 660. The biomass 12 previously will have been ground to an appropriate size for the application. Grinding to appropriate size can include grinding the biomass into cubes 220 of between one-quarter and one-eighth inch, which is the suitable size for fast pyrolysis. The hot exhaust 320 from the bypass duct 620 heats the biomass 12 in the biomass bin 650 until the biomass is dry 230. "Dry" in this context means that the biomass 12 has a moisture content on the order of about twelve percent.

Figure 9:
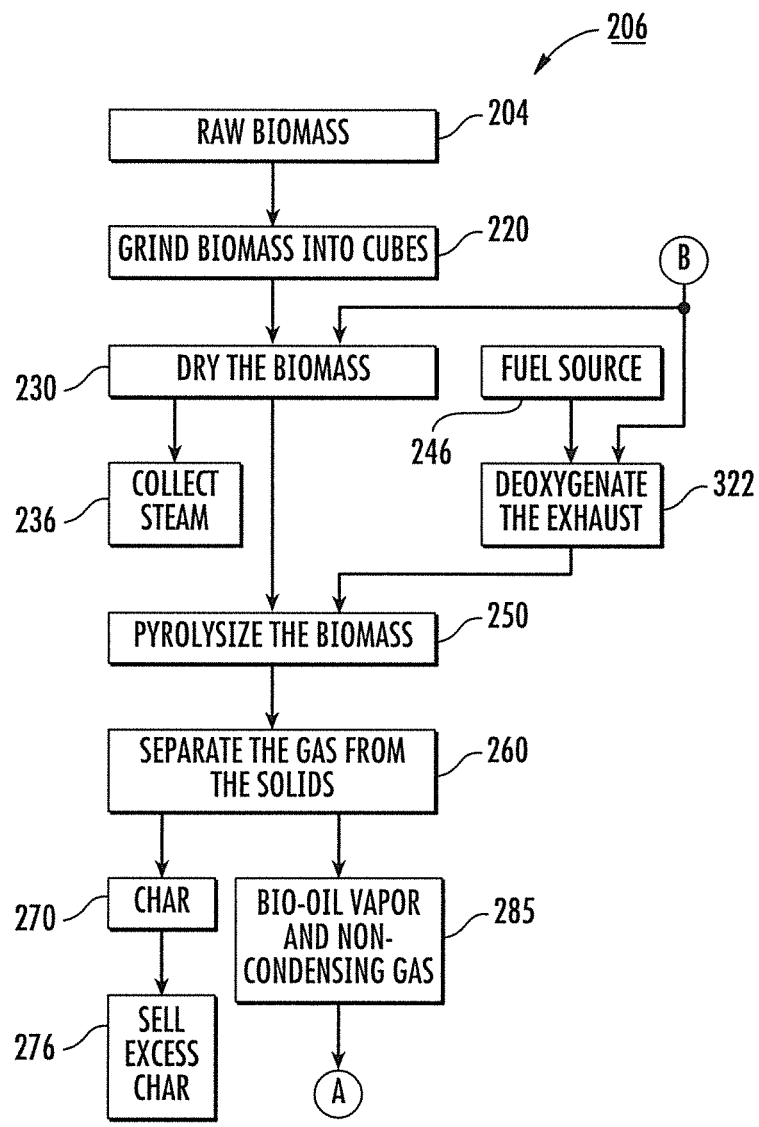
FIGS. 9 and 10 are flow diagrams of the conversion system shown in FIG. 7.

Also helping to dry the biomass 230 in FIG. 9 is one of the end products of the fast pyrolysis reaction, non-condensing gas 290, as discussed above. Non-condensing gas 290 is a mixture of gases consisting primarily of carbon monoxide and carbon dioxide. Mixed with the non-condensing gas 290 is pyrolysized oil vapor, which is also an end product of the fast pyrolysis reaction. This mixture 285 of non-condensing gas 290 and bio-oil vapor is swept from the pyrolysis reaction duct 660 to a collection of cooling tubes 710 (FIG. 6). Here, the pyrolysis oil vapor condenses out of the mixture 285, leaving behind the non-condensing gas 290 still in gas form. A non-condensing gas combustion fan 690 is connected to the outside of the apparatus 600 between the cooling tubes 710 and the green biomass bin 650. The combustion fan 690 sucks in outside air to mix with the non-condensing gas 290. The air and gas mixture 290 is then blown by fan 690 toward a non-condensing gas igniter 696. The igniter 696 ignites the air and gas 290 mixture. The ignition completely burns off the carbon monoxide portion of the non-condensing gas 290. The combustion fan 690 then blows the resulting hot non-condensing gas exhaust 654 into the biomass bin 650. The non-condensing gas exhaust 654 is mainly composed of carbon dioxide, nitrogen, and a small amount of oxygen. The thermal energy of the non-condensing gas exhaust 654, combined with the thermal energy of the turbine exhaust 320 that was channeled to the biomass bin 650 via the turbine exhaust bypass duct 620, flashes into steam the moisture from the biomass 12, thus completing the drying process 230. In an alternate embodiment, the non-condensing gas exhaust 654 is vented to the atmosphere so as to prevent overheating of the biomass 12. In the present embodiment, however, the non-condensing gas exhaust 654 is channeled to the pyrolysis reaction duct 660 where it reenters 740 the duct 660. In this way, the burned non-condensing gas exhaust 654 helps to control the temperature of the pyrolysis reaction. Meanwhile, the steam from the drying process 230 of FIG. 9 is captured in the condenser 656 for reuse by the system. In an alternate embodiment, the steam is vented to the atmosphere.

With continued reference to FIG. 6, a dry biomass feed auger 730 is connected to the biomass bin 650 on one end and to the pyrolysis reaction duct 660 on the other. A rotary valve 734 resides between the biomass bin 650 and the feed auger 730. The rotary valve 734 accepts dried biomass 12 from the biomass bin 650 and feeds it to the dry biomass feed auger 730. A second rotary valve 736 resides between the dry biomass feed auger 730 and the pyrolysis reaction duct 660. The feed auger 730 draws the biomass 12 up to the second rotary valve 736, where the valve 736 receives the biomass 12 and feeds it into the pyrolysis reaction duct 660. One end of the reaction duct 660 is oriented upward. Through this upward-oriented end the turbine exhaust 320 is received into the reaction duct 660. The opposite end of the pyrolysis reaction duct 660 is oriented downward. Once pyrolysis is completed, the resulting mixture 585 of non-condensing gas 290, pyrolysis oil vapor, and char 270 exit the pyrolysis reaction duct 660 through this downward-oriented end. The biomass 12 enters the reaction duct 660 via the feed auger 730 and associated rotary valve 736 somewhere beyond where the turbine exhaust 320 entered. The biomass 12 is blown through the reaction duct 660 towards the downward-oriented end at speeds great enough to keep the biomass 12 suspended in the heat stream. The biomass 12 need only be subjected to pyrolytic temperatures for approximately two seconds to become pyrolysized.

Also shown in FIG. 6, the char bin 680 resides below the pyrolysis reaction duct 660. The resulting pyrolysized mixture 585 of char 270 (FIG. 9), pyrolysis oil vapor, and non-condensing gas 290 exit the downward-oriented end of the pyrolysis reaction duct 660. At this point, the particles of char 270 are allowed to slow to a velocity at which they will no longer be suspended, thus allowing the char 270 to drop to the bottom of the bin 680 where it is collected. Some of the char 270 will be moved by the char fuel auger 670 up into the combustion duct 630 and into the turbine exhaust 320 to help fuel pyrolysis. The remainder of the char 270 may be processed into other forms and sold, such as activated charcoal for filters or pellets for use in pellet stoves.

Near the pyrolysis reaction duct 660 and separated from it by insulation 664 are a collection of cooling tubes 710. The cooling tubes 710 contain a fluid, such as water or oil that is re-circulated through a heat exchanger to keep the tubes 710 cool. In an alternate embodiment, the heat energy lost to the heat exchanger will be captured and reused by the system. In the present embodiment, the mixture 285 of non-condensing gas 290 and pyrolysis oil vapor exiting the pyrolysis reaction duct 660 is swept toward the cooling tubes 710. Water 700 is injected into the mixture 285 to aid in cooling it and to add water 700 to the condensing bio-oil to decrease its viscosity. The pyrolysis oil vapor condenses at approximately 140 degrees Fahrenheit. As it condenses, the bio-oil mixes with the water 700 and collects at the bottom 741 of the apparatus 600. The mixture of water 700 and bio-oil drains out through an oil drain 720 at the bottom of the apparatus 600. The non-condensing gas 290 is then channeled to the non-condensing gas combustion fan 690 where it is ignited to aid in drying the biomass 230 in the green biomass bin 650.

The fast pyrolysis systems disclosed above with reference to FIGS. 1-9 provide particular advantages for collocation at a facility that produces biomass in large quantities such as a sawmill and particularly a CNS facility. Using collocation techniques in accordance with the present invention, the large volume of biomass generated by a CNS facility permits the fast pyrolysis process to create bio-oil products that can be utilized to power the CNS facility. The specific details of such collocation techniques are described below with reference to FIGS. 7-12.

Figures 7, 8:
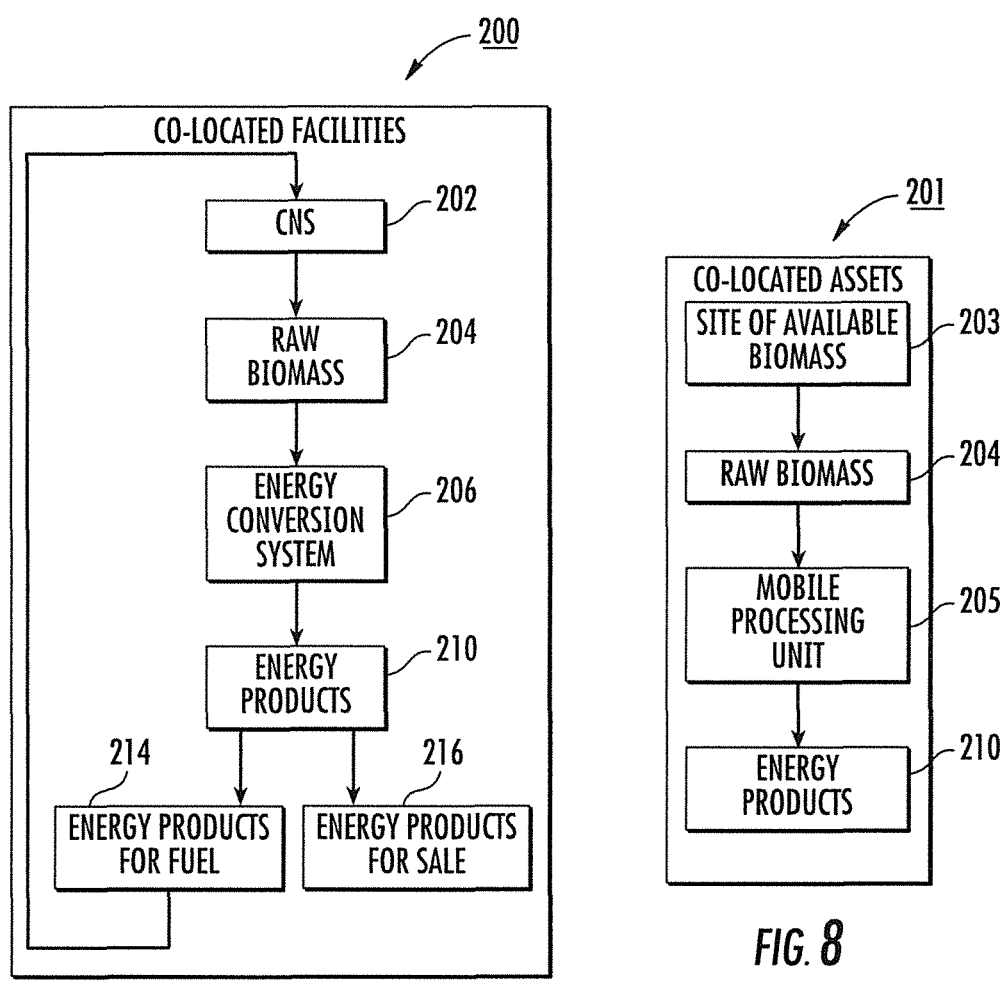
FIG. 7 is a flow diagram illustrating the use of the fast pyrolysis systems and apparatus of the present invention for optimizing the production of energy products from biomass such as sawmill waste.
FIG. 8 is a flow diagram of another system for optimizing the production of energy products from biomass in accordance with this invention.

Referring to FIG. 7, a collocation of facilities 200 comprises a CNS facility 202 and a fast pyrolysis system 206 such as those described above with reference to FIGS. 1-6. Although a CNS facility 202 is shown in FIG. 7, the energy-conversion system 206 can be collocated with any facility that generates raw biomass 204. The energy-conversion system 206 produces energy products 210. Some of the energy products 210 are used by the CNS facility 202 to power its operations 214, while the remainder are sold as energy products 216. The CNS facility 202, in turn, supplies the energy-conversion system 206 with raw biomass 204, which the energy-conversion system 206 uses as input to the fast pyrolysis process to produce the energy products 210. In the context of the system 200, the raw biomass 204 generally consists of wood chips, sawdust, bark, wood shavings, and the like.

Referring to FIG. 8, a collocation of assets 201 includes the collocation of a site 203 where available biomass 204 is located together with a mobile processing unit utilizing a fast pyrolysis system 205. The site of available biomass 203 supplies a mobile processing unit 205 with raw biomass 204.

Figure 10:
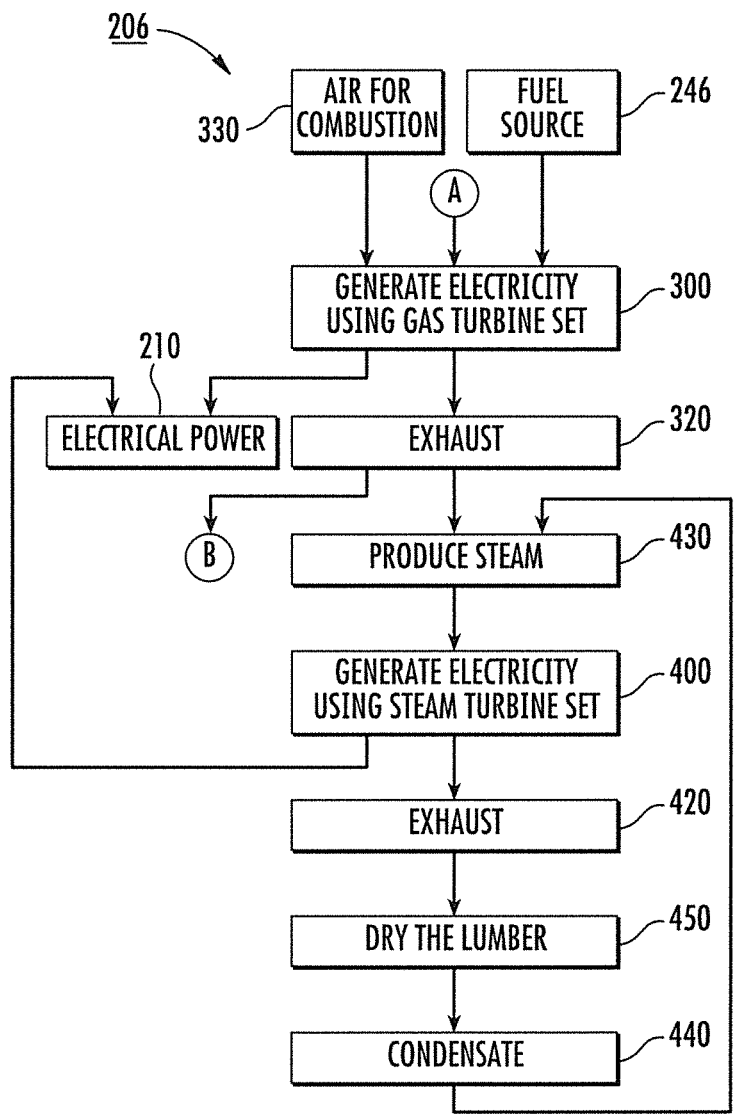

FIGS. 9 and 10 describe a preferred embodiment of the energy-conversion system 200 shown in FIG. 7. Referring first to FIG. 9, raw biomass 204 is ground into cubes at step 220. The ground biomass 204 is then subjected to drying 230. Optimally, the dried biomass 204 has a moisture content of no more than twelve percent. In other embodiments, steam resulting from the drying process 230 is collected for re-use by other parts of the system 200. Hot exhaust gas 320 from the fast pyrolysis system 206 is used in generating electricity 300 which, in turn, is used to aid in the drying process 230. The exhaust gas 320 has a typical temperature of approximately five-hundred degrees Fahrenheit or greater and has a typical oxygen content of approximately fifteen percent. A portion of the exhaust 320 is also used to aid in the rapid pyrolysizing of the biomass 250. Before the exhaust 320 can be used for fast pyrolysis 250, however, it must be deoxygenated. To rid the exhaust 320 of its oxygen, a fuel source 246 is introduced into the hot exhaust stream 320. Optimally, the temperature of the exhaust 320 is high enough to ignite the fuel source 246, resulting in combustion that deoxygenates the exhaust 322. The thermal energy of the hot, deoxygenated exhaust 320 is then used to rapidly pyrolysize the biomass 204. A variety of fuels can serve as the fuel source 246 as long as the fuel adheres to the characteristics required by the system 206. Non-condensing gas 290, bio-oil, char 270, and biomass 204 are a few examples of possible fuel sources 246. In an alternate embodiment, a single entry point for the biomass 204 and the fuel source 246 is used. The biomass 204 and fuel source 246 are introduced into the exhaust stream 320 together, thereby deoxygenating it. The raw biomass 204 itself can serve as the fuel source 246. The biomass 204 that is not combusted is then pyrolysized at step 250. In the present embodiment, rapid pyrolysizing the biomass 204 yields char 270 combined with a mixture of pyrolysis oil vapor and non-condensing gas 285. The char 270 is then separated at step 260 from this mixture of gases 285. The present embodiment 200 envisions using a cyclone or similar device to separate at step 260 the gas 285 from the char 270. Excess char 270 not used as fuel 250 is sold at step 276.

Referring to FIG. 10, the mixture of pyrolysis oil vapor and non-condensing gas 285 is used as fuel for a gas turbine set to generate electricity at step 300. An additional fuel source 246 may also be introduced. Along with the fuel 246, 285, air 330 is also provided to foster combustion. In some embodiments, the pyrolysis oil vapor will be separated from the non-condensing gas 290 of the mixture 285. The pyrolysis oil vapor will then be condensed and either used as fuel or sold. The non-condensing gas 290 is combustible and is used to help fuel more than one process used by the system, such as powering a gas turbine set 300 to provide thermal heat to dry biomass 204 at step 230. Electrical power 210 generated by the gas turbine set 300 is used to help supply the power needs of the collocated CNS facility 200, as shown in FIG. 1, or is sold as an energy product 210. The generation of electricity 300 also produces exhaust 320. As mentioned earlier, the exhaust 320 is used to provide thermal energy to aid in drying the biomass 204 at step 230 and also to aid in pyrolysis 250 (see FIG. 9). The exhaust 320 is further used to help produce steam 430 for use by a steam turbine set to generate electricity 400. The steam-producing process 430 also uses condensate 440 from a process used to dry lumber at step 450. In some embodiments, an additional fuel source is introduced to help produce steam 430, with electrical power generated by the steam turbine set 400 being used to help supply the power needs of the collocated facility 200, as shown in FIG. 7, or is sold as an energy product 210. In generating electricity, the steam turbine set 400 also produces exhaust 420. The exhaust 420 is used to dry lumber at step 450. A liquid condensate 440 is a product of the drying 450. The condensate 440 is predominately made up of water and is circulated back into the steam-producing system 430 for use by the steam turbine set at step 400.

Figure 11:
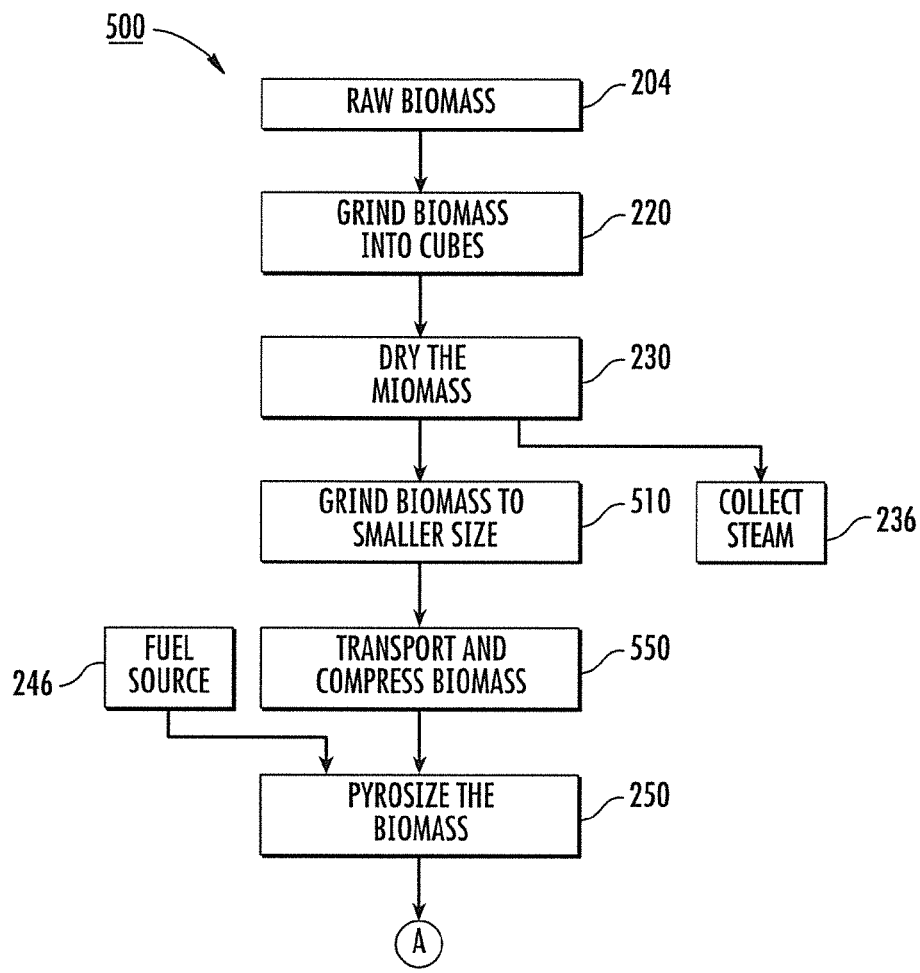
FIGS. 11 and 12 are flow diagrams illustrating a second embodiment of the system shown in FIG. 7.
Figure 12:
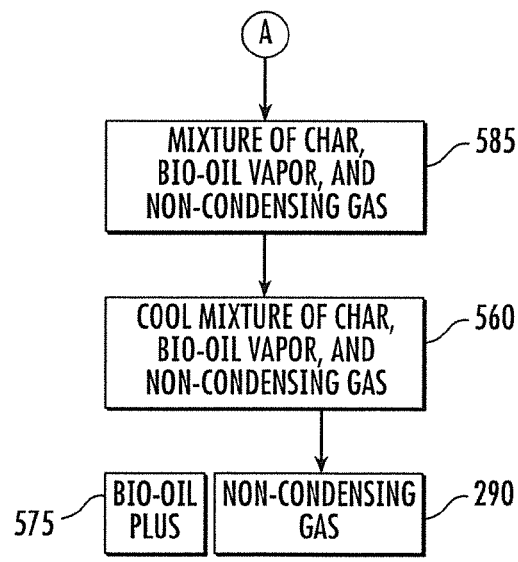

FIGS. 11 and 12 illustrate flow diagrams of another preferred embodiment of an energy-conversion system 500 in accordance with this invention. Referring first to FIG. 11, raw biomass 204 is ground into cubes of between about one-quarter and one-eighth inch. The ground biomass 12 is then subjected to drying 230. Steam from the drying process 230 is collected at step 236 for re-use by other parts of the system or vented to the atmosphere. The biomass 204 is now ground into a powder at step 510, in order to promote a faster reaction time when subjected to fast pyrolysis. In the present embodiment 500, the particle size and shape are optimized for the production of bio-oil plus at step 575. In other embodiments, the process to grind the biomass to a smaller size at 510 will be optimized for the production of bio-oil or other products. The dry powdered biomass 204 is compressed and transported at step 550 to a chamber where it is to be rapidly pyrolysized at step 250. The distance transported and the particulars of compression can be varied so as to optimize the production of the end-products sought. The powdered biomass 204 is then forced into a chamber under pressure where it is subjected to fast pyrolysis at step 250. A fuel source 246 supplies thermal energy to aid in the fast pyrolysis reaction 250. Optimally, the present embodiment 500 envisions pyrolysis taking no more than two seconds.

Referring now to FIG. 12, the output of the fast pyrolysis reaction 250 is a mixture 585 of char, pyrolysis oil vapor, and non-condensing gas. This mixture 585 of end-products is then cooled at 560. The cooling process 560 causes the pyrolysis oil vapor to condense and mix with the char in the mixture at step 585, thereby creating bio-oil at 575.

Another improved embodiment of a fast pyrolysis system is depicted in FIGS. 13-22 and designated generally by reference numeral 100, with like reference numerals from FIGS. 1 and 2 identifying common elements.

Figure 13:
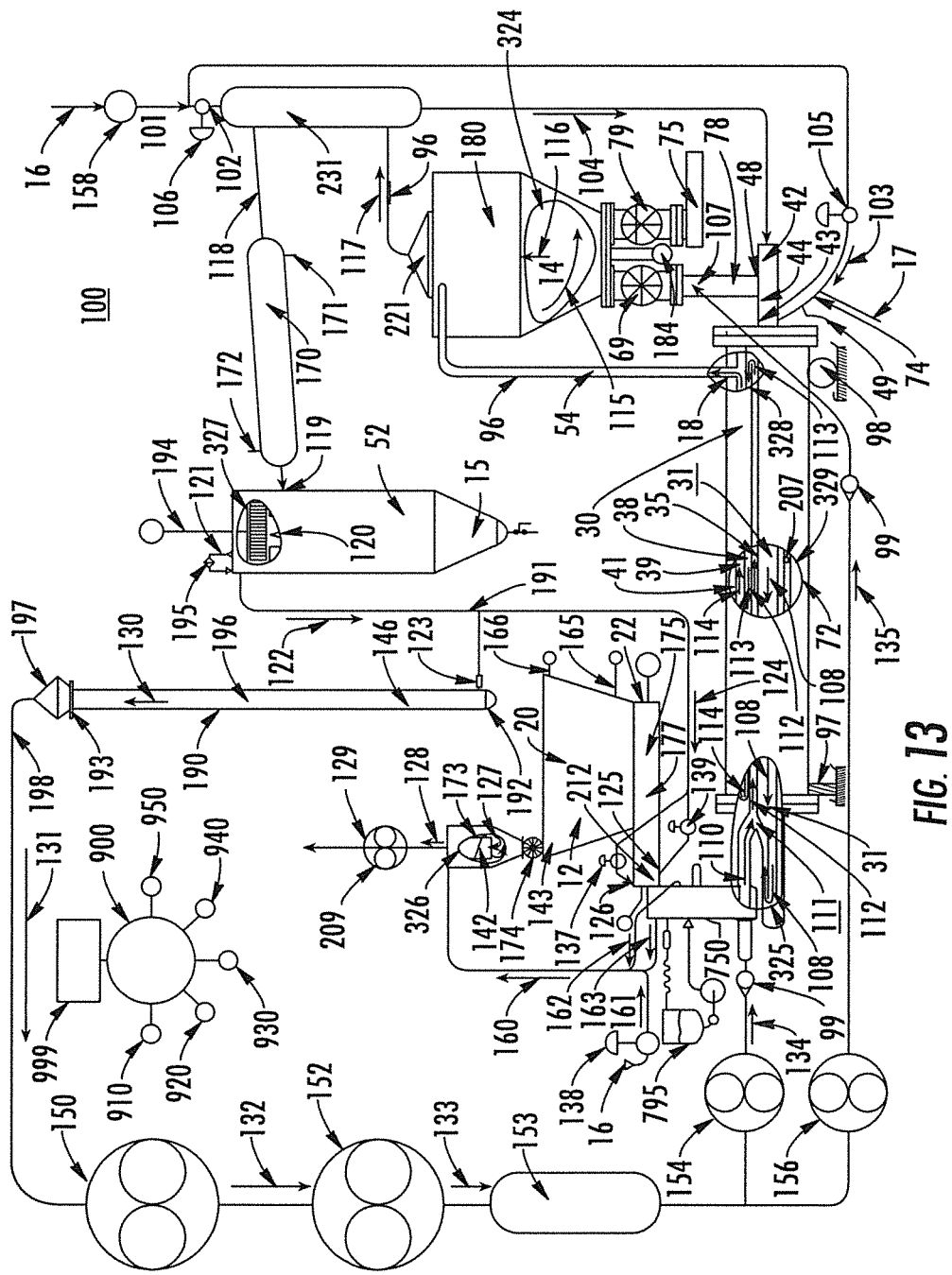
FIG. 13 is a flow diagram with partial sectional views of another pyrolytic system in accordance with the present invention utilizing, a hot gas filter, a clean-in-place sub-system, a Dual Entrainment Rotary Valve (DERV), a Dynamic Demister unit, a Disposable Filter Unit, and a Draft Filter.

Referring now to FIG. 13, the system 100 comprises a biomass feed bin 20 for receiving and delivering biomass 12 that is to be pyrolysized. The biomass 12 is fed through an in feed auger 166 while leveling augers 165 keep the biomass level and prevent bridging of the biomass 12. The biomass 12 is delivered from the feed bin 20 by a variable pitch auger 175 attached to a lower portion 22 of the biomass feed bin 20. In this way, the biomass feed bin 20 continually feeds new biomass 12 through the fast pyrolysis system 100.

Continuing with FIG. 13, the biomass feed bin 20 accepts raw biomass 12. The present embodiment envisions receiving this biomass 12 primarily from sawmills, particularly CNS facilities. The biomass 12 will typically not need to be ground to a smaller size because it will already be of a size suitable for use in the system 100. If the biomass 12 does need to be ground, however, the biomass 12 will be ground prior to being placed in the biomass feed bin 20. Note that in the embodiment of FIGS. 13-22, an optimal size for particles of biomass 12 used in the concentric-chambered pyrolysis system 100 are envisioned to be particles preferably having no side generally greater than about one-quarter inch in length. In alternate embodiments, however, items of biomass 12 having substantially larger dimensions may be used. Note also that in the present embodiment, items of biomass 12 are envisioned to consist generally of wood chips, sawdust, bark, wood shavings, and the like. In alternate embodiments, the use of biomass 12 of varying types received from numerous different sources may be used, including environmentally problematic materials such as waste paper and ground tire rubber.

Still referring to FIG. 13, biomass 12 fed into the system 10 of FIGS. 1-4 or the system 100 of FIGS. 13-22 may require drying prior to undergoing pyrolysis. Biomass 12 with a moisture content of approximately fifteen percent or less by weight can typically be subjected to pyrolysis without prior drying. Green biomass 12, however, will generally have a moisture content of about fifty percent by weight, as opposed to dry biomass 12 that generally will have a moisture content of about ten percent. The green biomass 12 can be blended with the drier biomass 12 to achieve a combined moisture content of fifteen percent or less. If such blending of the biomass 12 is insufficient to achieve a fifteen percent moisture content by weight, then the biomass 12 will need to be dried prior to subjecting the biomass 12 to pyrolysis. Optimally, the biomass 12 subjected to pyrolysis will have a moisture content of no more than twelve percent by weight. In some cases the biomass 12 may be too dry, in which case moisture can be added.

Referring again to FIG. 13, the system 100 includes a pyrolysis unit 30. The pyrolysis unit 30 includes a burn enclosure 44, an igniter 49, a combustion chamber 31, an inner pyrolysis chamber 35, an intermediate pyrolysis chamber 38, and an outer pyrolysis chamber 39, as shown in FIG. 13E. The burn enclosure 44 is in the general shape of an elongated tube open at each end. A heated air flow 104 enters one open end of the burn enclosure 44; the other end is attached to the combustion chamber 31. A fuel-air input duct 74, an igniter 49, and the Char-NCG duct 78 are attached radially to the burn enclosure 44. Ceramic insulation 42 is installed inside the burn enclosure 44 to reduce the amount of heat lost to the surrounding environment.

Continuing with the sectional view of FIG. 13E, the combustion chamber 31, the inner pyrolysis chamber 35; the intermediate pyrolysis chamber 38 and the outer pyrolysis chamber 39 are each also in the general shape of an elongated tube, with the four chambers 31, 35, 38, and 39 arranged generally concentrically. The combustion chamber 31 is innermost, the inner pyrolysis chamber 35 surrounds the combustion chamber 31, the intermediate pyrolysis chamber 38 surrounds the inner pyrolysis chamber 35; the outer pyrolysis chamber 39 surrounds the intermediate pyrolysis chamber 38, and insulation 72 surrounds the outer pyrolysis chamber 39. Each of the elongated chambers is rigidity mounted at one end with the other end allowed to move freely in length. The chambers are maintained in their generally concentric relationship by multiple alignment guides 207 that are affixed to respective chamber outer walls thereby holding the surrounding chamber in approximate concentricity relative to the inner chamber.

The use of a cantilevered support structure allows each of the chambers in the pyrolysis unit 30 to increase in length when operating at pyrolysis temperatures without binding or interference. For example, the end of the pyrolysis unit 30 in FIG. 13 distal from the burn enclosure 44 is anchored to the support structure 97 while the pyrolysis unit 30 end proximate to the burn enclosure 44 is in low friction contact with the structure 98 allowing an increase in length based on the operating temperatures of the system 100. The pyrolysis unit 30 has a length of approximately twenty feet at ambient temperature; the unit increases approximately two inches in length when at the desired operating temperature. Due to the cantilevered design, the expansion of the internal chambers is accommodated as the concentric chambers slide relative to each other with their concentric relationship maintained by the plurality of alignment guides 207. The concentric multi-chamber design is efficient thermodynamically and also presents a favorable length versus volume of pyrolysis chamber. A single pyrolysis chambered system of equal chamber volume of the multi-chambered concentric design would be three times in length or approximately 60 feet and would expand approximately six inches when at its desired operating temperature. Expansion joints 96 are used as required to allow the pyrolysis unit 30 to expand in length without restriction by fixed components such as the cyclone separator 180, the economizer 231, and the condenser 170.

In the embodiment of FIGS. 1 and 2, the cantilevered construction is reversed, with the rigid support 11A fixed under the burn enclosure 44 and the low friction support 11B under the opposite end of the unit 30.

Figure 13A:
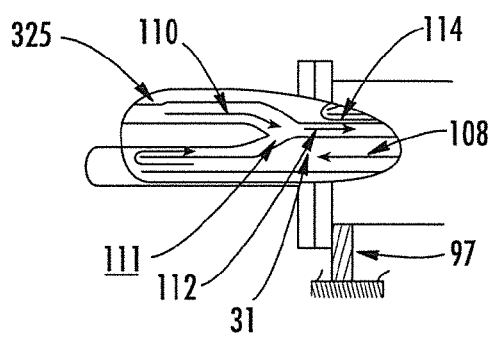
FIG. 13A is a partial sectional view of the mixing section of FIG. 13.
Figure 13B:
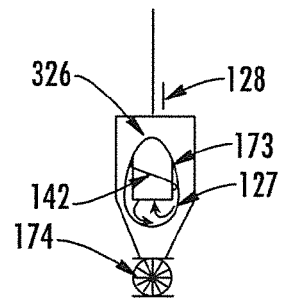
FIG. 13B is a partial sectional view illustrating the biomass cyclone flow of FIG. 13.
Figure 13C:
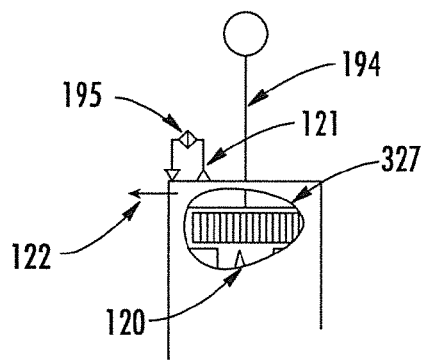
FIG. 13C is a partial sectional view illustrating the dynamic demister flow of FIG. 13.
Figure 13D:
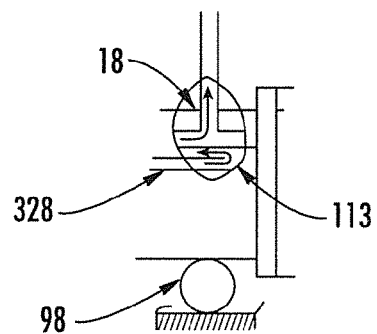
FIG. 13D is a partial sectional view illustrating the gas flows at the exhaust end the pyrolysis unit of FIG. 13.
Figure 13E:
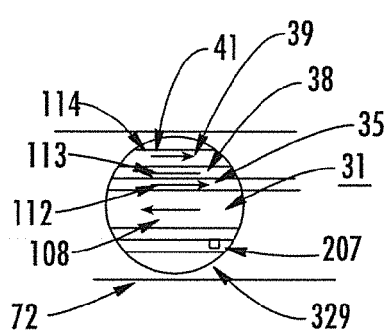
FIG. 13E is a partial sectional view illustrating the gas flows in the combustion and pyrolysis chambers of FIG. 13.

Referring now to FIGS. 13A and 13E, each of the chambers 31, 35, 38, 39 of the pyrolysis unit 30 shares a wall with an adjacent chamber 31, 35, 38, 39. In this way, each of the four chambers 31, 35, 38, 39 function as a heat exchanger, promoting heat transfer in three ways. First, conductive heat is transferred through the common walls of the chambers 31, 35, 38, 39 by high thermal energy gas stream 108 (shown as an arrow in FIG. 13A). Second, concurrent heat flow is transferred by the high thermal energy gas stream 108, 113, 114, (shown as arrows in FIG. 13A), and char 14 to the biomass undergoing pyrolysis, as described below with reference to FIG. 13. Third, countercurrent flow heat is transferred by the gas stream 108, 113, 114 flowing throughout the chambers 31, 35, 38, 39. The generally concentric configuration of the pyrolysis unit 30 allows for reuse of heat that would otherwise be lost to the surrounding environment. Insulation 72 (see FIG. 13E) is installed adjacent of an outer wall of the pyrolysis unit 30 to reduce the amount of heat lost to the surrounding environment.

Referring again to FIG. 13, pressurized air 101 (shown as an arrow) is metered by control valve 105 as a variable flow of oxygen rich air 103 and delivers it into the burn enclosure 44 through the fuel-air input duct 74. The air 103 can be pre heated, thereby improving the thermal efficiency of the total process but does not have to be preheated. Fuel 17 (shown as an arrow) is also delivered under pressure to the fuel-air input duct 74 where the air 103 and fuel 17 are mixed. The fuel 17 and air 103 are ignited by igniter 49. Combustion of the fuel-air mixture 17, 103 produces heat and removes oxygen from the burn enclosure 44 and the attached combustion chamber 31 forming a portion of the substantially deoxygenated, continuous heated gas stream 108. A variety of fuels 17 can be used for this purpose, such as fuel oil, natural gas, LP gas, or bio-oil 15.

Continuing with FIG. 13, pressurized air 101 (shown as an arrow) is metered by control valve 106 as a variable flow of oxygen rich air, 102 to the economizer 231. The preheated air 104 (shown as an arrow) exits the economizer 231 and enters the burn enclosure 44. The air 101 need not be pre-heated; however, preheating the air improves the thermal efficiency of the system 100. The char 14 is fed from the cyclone separator 180 by a rotary valve 69 attached to the lower portion of the cyclone separator 180. Char-NCG flow 135 is delivered to the char duct 78 thru a check valve 99. The char-NCG flow 135 entrains the char 14 as flow 107 and delivering it to the burn enclosure 44 through duct 78 attached to the top of the burn enclosure 44, while also providing cooling of the rotary valve 69. The preheated air 104 mixes with the char-NCG flow 107 in the burn enclosure 44 and is ignited by the burning fuel-air mixture 103, 17 forming a portion of the continuous heated gas stream 108 (FIG. 13A). A key function of the char-air mixture 14, 104 is to burn off any excess oxygen otherwise remaining in the burn enclosure 44 and combustion chamber 31 following combustion of the fuel-air mixture 17, 103.

Still referring to FIG. 13, the igniter 49 ignites the fuel-air mixture 17, 103. The ignited fuel-air mixture 17, 103 in turn, ignites the char-air-NCG mixture 107, 104. Combustion begins generally in the burn enclosure 44 and continues into the combustion chamber 31 where the mixtures 17, 103 and 107, 104 are substantially fully combusted. Although it is preferable that all of the oxygen remaining in the burn enclosure 44 and combustion chamber 31 be consumed, it is not required. Feeding of the mixtures 17, 103 and 107, 104 along with ignition of the mixtures, is done in a continual sequence during operation of the system 100.

Continuing with FIG. 13, to burn off any excess oxygen that would otherwise remain in the burn enclosure 44 and combustion chamber 31 following ignition of the fuel-air mixture 17, 103 and the char-air-NCG mixture 107, 104 requires that a certain minimum amount of char 14 be present in the burn enclosure 44. During typical operation of the system 100, however, more than this minimum amount of char 14 is introduced into the burn enclosure 44. Therefore, excess char 14 is present in the combustion chamber 31 following combustion of the mixtures 17, 103 and 107, 104. The particles of excess char 14 radiate heat to the surroundings as the char 14 travels through the chambers 31, 35, 38 and 39. Eventually, the excess char 14 becomes entrained within exhaust 18 from a new pyrolysis reaction, with the excess char 14 mixing with newly-pyrolysized char 14, as described below with reference to FIG. 13. In an alternative embodiment the char 14 becomes the primary fuel for the pyrolysis unit 100.

Referring now to FIGS. 13A, 13D, and 13E, the continual combustion of the mixtures 17, 103 and 107, 104 flows out of the of the burn enclosure 44 and through the combustion chamber 31, mixing and forming a substantially deoxygenated, continuous heated gas stream 108 (shown as arrows). The continual production of the heated gas stream 108 from the burn enclosure 44 and the combustion chamber 31, together with an impetus provided by injection of the fuel-air mixture 17, 103 and the char-air-NCG mixture 107, 104 into the burn enclosure 44 under pressure, propels the high thermal energy gas stream 108 in a first direction through the combustion chamber 31. As shown in FIG. 13A, heated gas stream 108 (shown as an arrow in FIG. 13A) reverses direction as it leaves the combustion chamber 31 and enters the mixing area 111. Entrained biomass 110 enters the mixing area 111 where the two streams 108, and 110 mix becoming a pyrolytic flow 112 (shown as an arrow in FIG. 13A). Pyrolytic flow 112 flows through pyrolysis chamber 35.

Referring now to FIG. 13E, the pyrolytic flow 112 reverses as it leaves pyrolysis chamber 35 and enter pyrolysis chamber 38 as pyrolytic flow 113. Pyrolytic flow 113 flows through chamber 38. Pyrolytic flow 113 reverses as it leaves pyrolysis chamber 38 and enters pyrolysis chamber 39 as pyrolytic flow 114. Pyrolytic flow 114 flows through pyrolysis chamber 39 and enters exhaust duct 54 as pyrolized flow 18 as shown in FIG. 13D. As the pyrolytic flows 112, 113, 114 travel through the chambers 35, 38, 39 the high thermal energy gas stream 108 will decrease in temperature while the biomass 12 will increase in temperature and thereby cause the biomass to undergo pyrolysis.

Continuing with FIG. 13E, in addition to heat radiating from the flow of the high thermal energy gas stream 108 through the pyrolysis unit 30 heat from the high thermal energy gas stream 108 is also conducted along the generally concentric chambers 31, 35, 38, 39 through the common walls of the chambers 31, 35, 38, 39. In this way, the chambers 31, 35, 38, 39 operate as a countercurrent flow heat exchanger. Note that the temperature of the combustion chamber 31 during operation of the system 100 is typically in excess of six-hundred-fifty degrees Celsius.

Referring now to FIG. 13, biomass 12 is fed from the biomass feed bin 20 by the variable pitch auger 175 attached to the lower portion 22 of the biomass feed bin 20. The variable pitch auger 175 conveys the biomass 12 out of the feed bin 20 where it is entrained by NCG flows 126 and 127 becoming entrained flow 212. The Dual Entrainment Rotary Valve (DERV) 750, in turn, introduces the biomass 12 into the pyrolysis unit 30 at the mixing area as entrained mixture flow 110 consisting of biomass 12 and NCG flow 134.

The improved systems of FIGS. 1-4 and 13 include a Dual Entrainment Rotary Valve (DERV) 750 to accommodate the variable operating pressures 240 of the pyrolysis systems 10 and 100. Details of the Dual Entrainment Rotary Valve (DERV) 750 are now described with reference to FIGS. 15-18.

Figure 15:
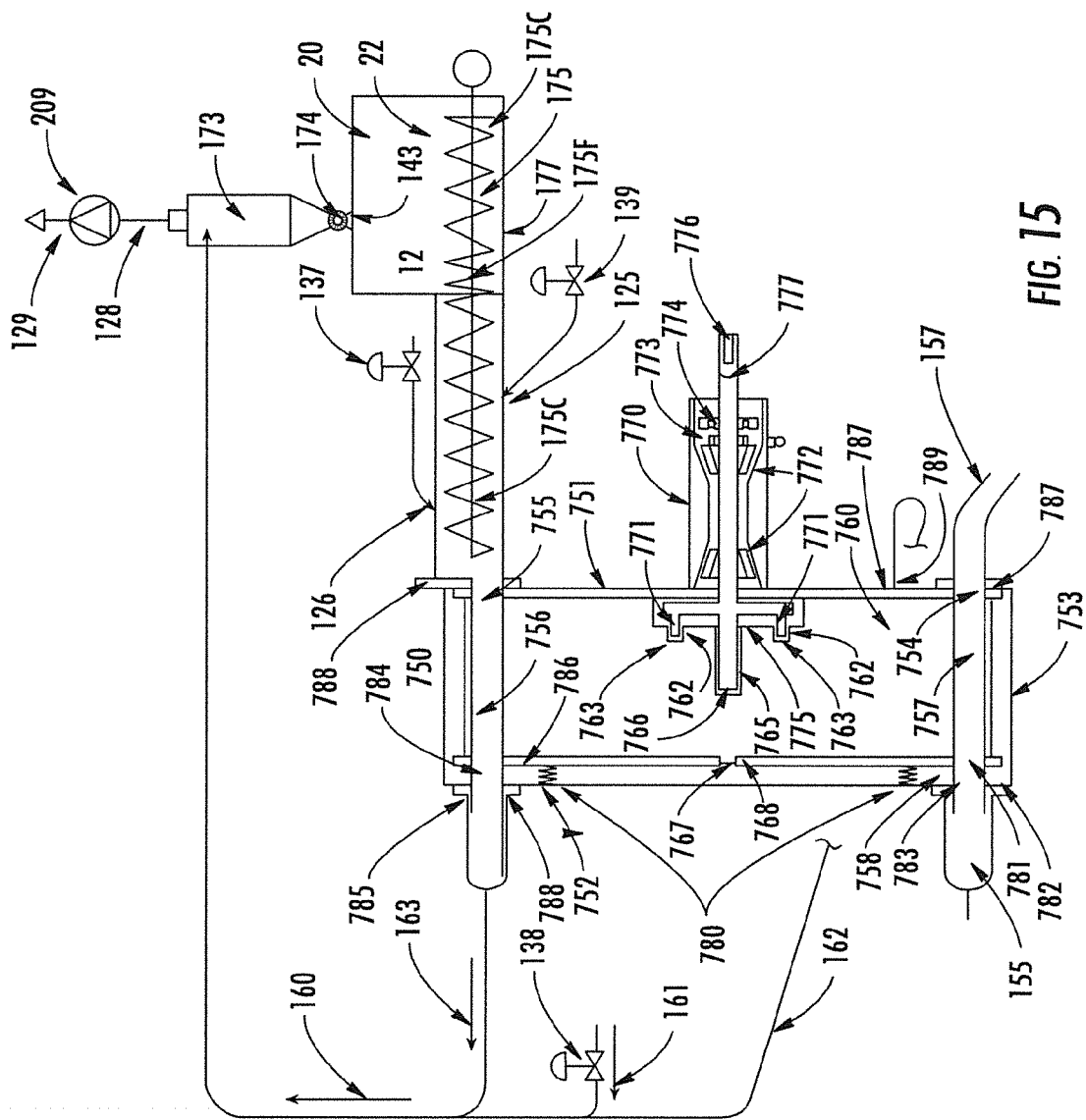
FIG. 15 is a cross sectional side view of a portion of the DERV and associated biomass feed bin and auger unit.

Referring first to FIG. 15, the DERV 750 has a biomass inlet port 755 and a biomass outlet port 754 with biomass 12 transported between those ports by a rotating cylinder 760 containing a plurality of chambers 761. In the embodiment of FIG. 13, the biomass inlet pressure 756 is below atmospheric due to the draft of blower 209 while the biomass outlet pressure 757 is above atmospheric pressure and above the pyrolysis unit pressure 240.

Referring to FIGS. 13 and 15; during operation of the DERV 750, biomass 12 is moved from the biomass bin 20 by the variable pitch auger 175 through the auger housing 177. The biomass 12 fills the auger fine pitch section 175F at the lower section 22 of the biomass bin 20 and is moved towards the DERV biomass inlet 755 by the rotation of the auger 175. As the biomass 12 moves towards the DERV biomass inlet 755, the pitch of the auger 175 increases to a coarse pitch 175C reducing the biomass density 159 per cubic foot of the auger housing 177. The biomass 12 mixes with the NCG entrainment flows 126 and 125 provided by the flow control valves 137 and 139, becoming entrained biomass flow 212. The entrained biomass flow 212 is drawn into the DERV biomass inlet 755 and flows through the sequentially aligned plurality of chambers 761 of the cylinder 760. Each chamber 761 is filled with the entrained biomass flow 212 and captures a volume of the biomass 212 as it passes from the entrainment inlet 755 to the closed surfaces of the fixed seal plates 786 and 787. The entrainment inlet 755 is an elongated shape (refer to FIG. 17) that facilitates the flow of the entrained biomass 212 into the moving chambers 761 of the cylinder 760. The elongated shape reduces jamming of the biomass 12 as the filled chambers exit the DERV biomass inlet 755.

Returning to FIG. 15, the entrained biomass flow 212 passes unrestricted through the aligned cylinder chamber 761 leaving the chamber 761 through port 784 as biomass bypass flow 163. The pressure of the DERV biomass inlet 755 is maintained below atmospheric by the flow of air 16 as flow 161 through flow control valve 138. The flows 161, 162 and 163 forms flow 160 that enters the cyclone separator 173. The biomass 12 contained in biomass bypass flow 163 is separated from the cyclone exit flow 128 and is returned to the biomass bin 20 through rotary valve 174 as bypass biomass 143. The bypass biomass 143 mixes with the biomass 12 where it is available for feeding to the pyrolysis unit 30. The biomass free exhaust flow 128 is drawn through the exhaust blower and vented to atmosphere as exhaust flow 129. In other embodiments the exhaust flow 129 is captured in whole or in part to recover certain materials and energy that exist in the exhaust flow 129.

Continuing with FIGS. 13 and 15; the loaded chambers 761 sequentially move from the DERV biomass inlet 755 to the DERV biomass outlet 754 by the rotation of the cylinder 760. The biomass 12 in the sequentially presented chambers 761 is entrained by the NCG flow 139, becoming entrained biomass flow 110 moving into the mixing area 111 of the pyrolysis unit 30 at the pyrolysis unit pressure 240. As the plurality of sequential chambers 761 leave the outlet 754, they contain NCG at the pyrolysis unit pressure 240; passing the scavenge port 789; the pressure within each of the sequentially presented chambers 761 is reduced below atmospheric by drawing the contained gas through as flow 162. The scavenged flow 162 also contains a flow of air 16 to assist in entrainment of any residual biomass 12 in the chamber with the scavenge flow 162.

Figure 16:
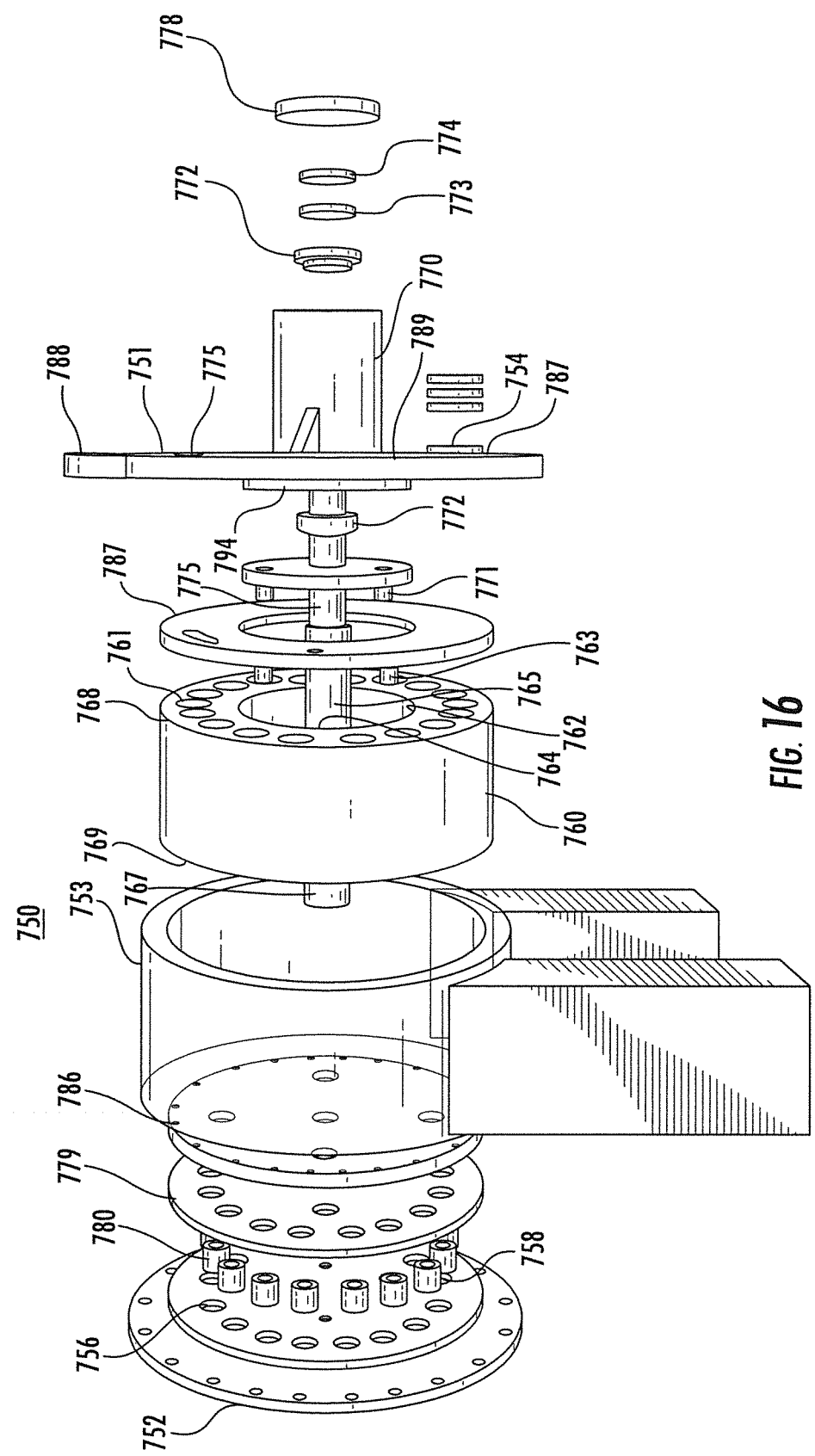
FIG. 16 is an exploded view of the DERV.

FIG. 16 is an exploded view of the DERV 750. Cylinder 760 contains a plurality of cylindrically shaped chambers 761 concentric and parallel with the axis 764 of the cylinder 760. The chambers 761 are open at the inlet face 768 and the outlet face 769 of the cylinder 760. In alternative embodiments a filter screen is installed at the outlet face 769 separating the biomass 12 from the entrained biomass flow 212 and eliminating bypass biomass 143.

Continuing with FIG. 16; a drive shaft system 770 comprises a set of bearings 772, a drive shaft 775, a locking nut 773, a shaft seal 774 and a seal cover 778. The drive shaft 775 has a set of drive pins 771 on one end and a keyed shaft 776 (see FIG. 17) on the opposite end. A felt seal 794 prevents lubrication form flowing from the drive 770 into the housing 753.

Figure 18:
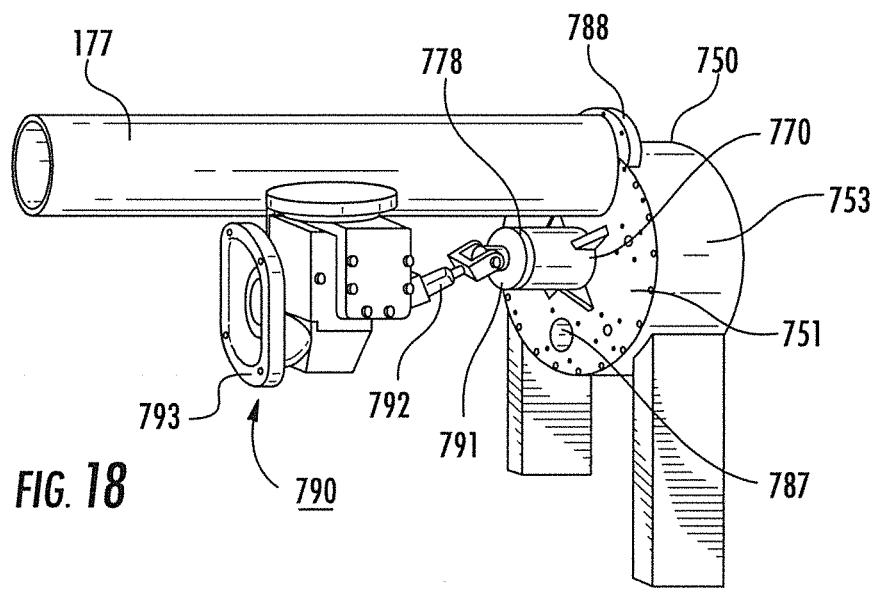
FIG. 18 is a rear elevation of the DERV and variable pitch auger housing.

Refer to FIG. 18. The drive system 790 comprises a drive shaft system 770 including an integrated part of the housing front plate 751. The drive system 790 provides rotational torque to the cylinder 760 through universal shaft adapter 791, drive shaft with universals 792, gearbox 793 and a motor (not shown) as controlled by the programmable process controller drive 950 (refer to FIG. 22).

Returning to FIG. 16; the fixed seal plate 787 is mounted to the housing front plate 751, concentric with the drive shaft system 770 and in alignment with the entrainment inlet 755, the outlet port 754 and the scavenge port 789. The housing front plate 751 is fastened to the housing 753 using standard bolting and sealant. Cylinder 760 contains a counter bore 764 with a bushing 765 that are concentric with the drive shaft 775. The cylinder 760 also contains drive pin counter bores 762 and bushing 763 that align with the drive pins 771 of the drive shaft. This arrangement ensures that the cylinder 760 operates concentrically with the drive shaft 775 while remaining unrestricted with its axial position. The cylinder 760 floats on the drive shaft 775 with the cylinder inlet face 768 sealing against the fixed seal plate 787. The floating seal plate 786 is mounted to a support plate 779. The floating seal plate 786 mounts concentrically on the cylinder shaft extension 767 and is maintained in concentric alignment with the cylinder 760. The floating seal plate 786 and support plate 779 are pressed against the outlet cylinder face 769 by a plurality of compression springs 780 and the housing rear plate 752 is fastened to the housing 753 using standard bolting and sealant. The compression allows the cylinder 760 to move towards to fixed seal plate 786 with wear while the floating seal plate moves towards the cylinder outlet face 769 with wear. This arrangement ensures that the cylinder faces 768 and 769 maintain a tight seal with the fixed and floating seal plates 787, 786.

Figure 17:
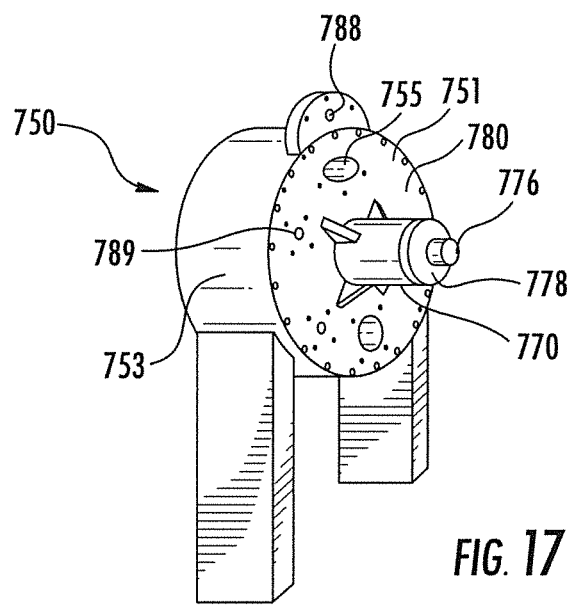
FIG. 17 is a perspective elevation of the front of the DERV.

Referring to FIGS. 16 and 17, the DERV 750 with the housing front plate 751, the housing 753 and housing rear plate 752 are bolted together to form a sealed unit. The compression springs 780 when assembled place a compression spring force 796 on the DERV floating seal backing plate 779, towards the cylinder 760. The attached floating seal plate 786 is tightly pressed against the outlet face 769 of the cylinder 760; in turn, the inlet face 768 of the cylinder 760 is pressed against the fixed seal plate 787 forming the desired sealing of the cylinder 760. The floating seal plate 786 and steel plate 779 spring side is at the pressure of the DERV housing pressure 758 while the fixed seal plate is at atmospheric pressure. The DERV housing pressure 758 is equal to or above atmospheric pressure; thereby producing a positive pressure and force on the DERV floating seal backing plate 779. This pressure force 797, adds to the compression spring force 796 thereby increasing the force holding the floating seal plate 786, and the cylinder outlet face 769 along with the fixed seal plate 787 and the cylinder inlet face 768 in the desired sealed relationship.

FIG. 13 shows oil system 795 that supplies lubricant to the cylinder and seal surfaces as well as cooling fluid to the DERV 750. In an alternative embodiment, the DERV 750 is allowed to run at the pyrolysis unit pressure 240 with the oil system 795 supplying intermittent lubrication.

Refer to FIG. 15; extension 784 attaches to the floating seal plate 786 and seals to the housing rear plate 752 with seal 785. Extension 781 attaches to the floating seal plate and seals to the housing rear plate 752 with seal 783. Gaskets are used to seal the connection at 788, 782, 787 and 788.

Returning to FIG. 13; the high thermal energy gas stream 108 (shown as arrows in FIGS. 13A and E) mixes with the entrained biomass 110 and moves through the inner pyrolysis chamber 35 as flow 112. As the high thermal energy gas stream 108 and the entrained biomass 12 move along as flow 112, thermal energy is transferred from the high thermal energy gas stream 108 to the biomass 12 and rapidly pyrolysizes the biomass 12 to form pyrolysis oil vapors 51, char 14, and non condensing gas 50. Optimally, pyrolysis of the entrained biomass 12 takes no more than two seconds. Exhaust 18 (shown as an arrow in FIG. 13D) resulting from the pyrolytic reaction comprises primarily non-condensing gases 50, pyrolysis vapor 51, and char 14 that are all entrained by the high thermal energy gas streams 108, 112, 113, and 114. Note that the non-condensing gases 50 are substantially made up of carbon dioxide, carbon monoxide, and nitrogen. The char 14 includes excess, non-combusted char 14 from the char-air-NCG mixture 107, 104 that was introduced into the burn enclosure 44, as described above. In alternate embodiments, various forms of inert material can be employed to assist in the transfer of heat to the biomass that is to be pyrolysized. These inert materials may be recovered by a cyclone filter 180 for reuse in the continuous pyrolysis process as described below with reference to FIG. 4.

Figure 13F:
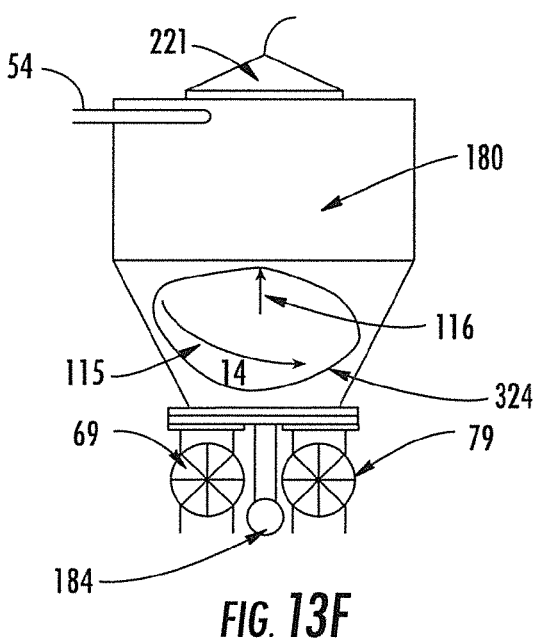
FIG. 13F is a partial sectional view illustrating the cyclone flows of FIG. 13.

Still referring to FIG. 13, the exhaust 18 from the pyrolytic reaction, along with any remaining non-pyrolysized biomass 12, flows out of the pyrolysis chamber 39 into duct 54 as shown by FIG. 13D. In some instances it is possible that a small quantity of oxygen will remain in one or more of the chambers 31, 35, 38, 39. In this event, some of the biomass 12 will combust with the oxygen rather than pyrolysize thereby yielding additional thermal energy for pyrolysis of the remaining biomass 12. As shown in FIGS. 13 and 13F, the exhaust duct 54 is fitted to the pyrolysis unit 30 and attaches to the cyclone separator 180.

Details of the cyclone separators 180 will now be described with reference to FIGS. 4 and 14. The cyclone separator 180 of FIG. 14 comprises a body 84 with a collection cone portion 86, a central exhaust cylinder 181, and a hot gas filter element mounting plate 183, a bridge breaker 184, a rotary valve mount flange plate 182, and an inflow pipe 82. The collection cone portion 86 is in the general shape of a cone having an upwardly facing mouth 87 and an opposing open end 88 for collecting and distributing char 14 that has been separated from the exhaust 18 (shown as an arrow). The central exhaust cylinder 181 resides in the approximate center of the body 84 with the collection cone portion 86 located beneath and concentrically with a lower end of the central exhaust cylinder 181. The central exhaust cylinder 181 is used for carrying the pyrolysis oil vapors 51 and the non condensing gas 50 out of the cyclone separator 180 following separation of the entrained char 14 from the exhaust 18 and into the hot gas filter 221. (Shown with the top removed.) A plurality of hot gas filter elements 223 are mechanically attached to the mounting plate 183 of the cyclone filter fixing the filter media of the hot gas filter 221 within the central exhaust cylinder 181 of the cyclone separator 180.

Continuing with FIGS. 13 and 14, the exhaust duct 54 connects to an end of the inflow pipe 82. The cyclone separator 180 draws the exhaust 18 downwardly through me inflow pipe 82 toward the mouth 87 of the collection cone portion 86. As the exhaust 18 spirals downwardly toward the mouth 87 of the collection cone portion 86, centrifugal force drives the particles of char 14 entrained within the exhaust 18 toward the inner wall of the cyclone body 84 where the particles of char 14 slow down and become un-entrained as flow 115 from the exhaust flow 116. As the particles of char 14 exit the cyclone body 84, the char 14 falls into the mouth 87 of the collection cone portion 86 and exits the open end 88 of the collection cone portion 86. Connected to the open end 88 is a rotary valve mount flange plate 182 with a port for fuel char passage 186 into the rotary valve 69, a port for excess char passage 187 to the rotary valve 79, and a bridge breaker 184 which stirs the char 14 providing positive feed of the char 14 to the ports 186, 187 and also preventing clogging of the ports 186, 187. The rotary air lock 69 feeds the char 14 into the char duct 78. A given amount of the char 14 from the cyclone 180 will be fed into the burn enclosure 44. Since the collection cone 86 is continually filling with char 14 from the cyclone separator 180, char 14 is removed from the collection cone 86 to keep the collection cone 86 from overflowing. Excess char 14 is removed through the port 187 and rotary valve 79 as an end product of the system 100.

At this point, substantially all of the larger sized char 14 has been removed from the exhaust 18. The substantially char-free exhaust 116 (shown as an arrow in FIG. 13F) flows through the hot gas filter elements where micron sized particles of char are removed. These micron sized particles of char 14 accumulate on the outside of the hot gas filter elements forming a layer of char 225. During operation of the system 100, this build up of char 225 proportionally increases the amount of pressure required for the pyrolysis vapor 51, and the NCG 50 to pass through the hot gas filter elements 223; and thereby increasing the operational pressure of the pyrolysis system 100.

Figure 21:
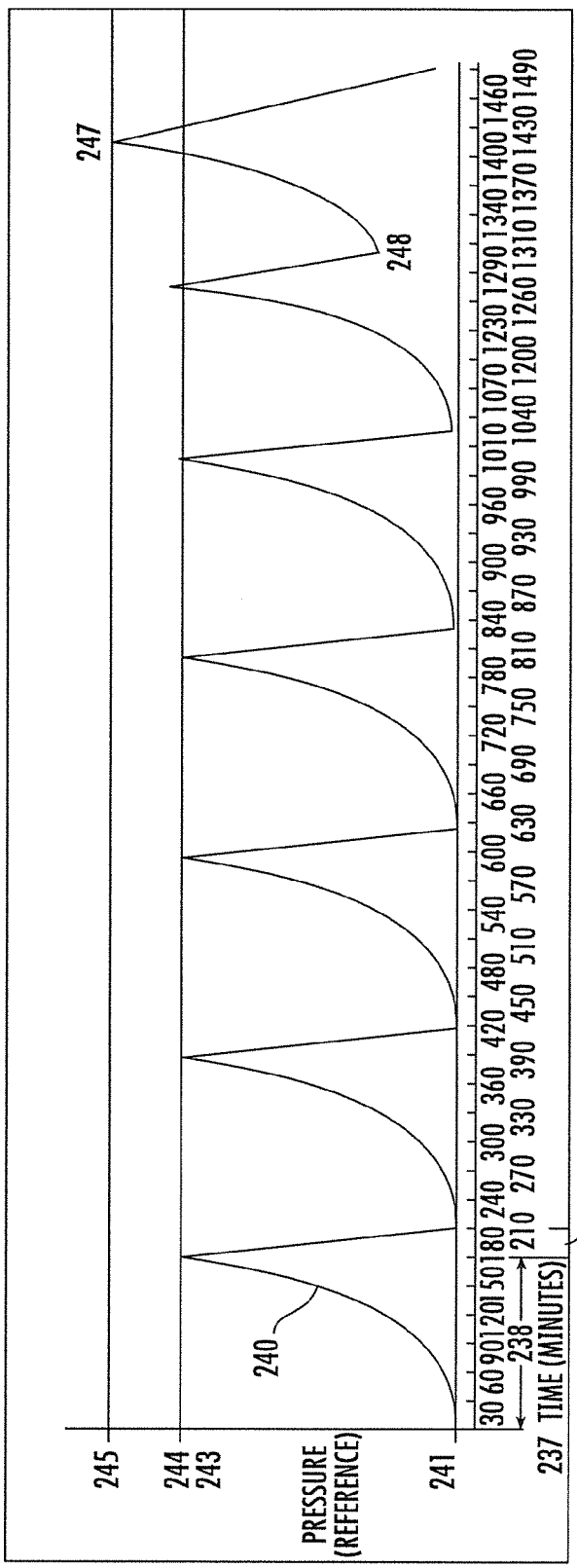
FIG. 21 is a graph of the pressure of the pyrolysis system versus operating time.
Figure 22:
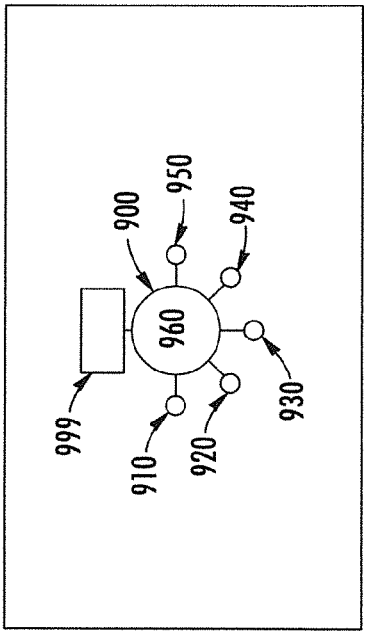
FIG. 22 is a functional diagram of the programmable control system.

FIG. 21 is a graph of the pyrolysis unit pressure 240 versus operational time. The periodic nature of the pyrolysis unit pressure 240 is quantified by the graph using reference numbers. During a first period 231 the pyrolysis unit pressure 240 increases from an initial pressure 241 towards a higher pressure 244. As the system pressure 240 increases, the worked preformed by the pressurized air system 158 and the NCG blowers 150, 152, 154 and 156 increases. A pressure 245 where these systems will no longer be able to supply the required flow will be reached rendering the pyrolysis unit 30 inoperable. A technique has been developed to clean the hot gas filter elements 223 without removing the filter elements 223 from the hot gas filter 221. While operating the pyrolysis unit 30, the pyrolysis system pressure 240 is monitored by the programmable process controller 900. Upon reaching a preset pressure 243, the programmable process controller 900 initiates a Clean In Place (CIP) Procedure shown as a logic flow diagram at FIG. 20. Referring to FIG. 20, the programmable process controller 960 monitors pyrolysis unit pressure 240, 961 and initiates a clean in place routine 800 when the pyrolysis unit pressure 240 exceeds a set point 234, 962. The flowing actions taken by the programmable process controller 960 are as follows and are illustrated at FIG. 20:

| | |
|---|---|
| 810 | Hot Gas Filter Clean In Place |
| 811 | Stop Biomass 12 |
| 812 | Stop Fuel 17 |
| 813 | Stop Char 15 |
| 814 | Increase Air Flow 104 |
| 815 | Monitor Hot Gas Filter Temperature |
| 816 | Control Air Flow 104 to limit Hot Gas Temperature |
| 817 | When Pressure 240 drops below 242 stop CIP |
| 820 | Begin Pyrolysis |
| 821 | Set Air Flows 103 & 104 for ignition of fuels |
| 822 | Start Fuel 17 |
| 823 | Start Char 14 |
| 824 | Establish desired combustion rate |
| 825 | Start Biomass 12 for Pyrolysis |

Returning to FIGS. 13 and 14, the hot filtered gas 117 is now principally comprised of non-condensing gases 50 and pyrolysis oil vapor 51. The hot gas filter exhaust 117 flows into an economizer 231 where thermal energy is transferred from the exhaust 117 to the pressurized air stream 102 leaving the economizer 231 as preheated air flow 104. The economizer 231 is a closed tube and shell heat exchanger designed as shown with a transparent outer housing on FIG. 14. The hot gas filtered exhaust 117 exits the economizer 231 as partially cooled hot gas filtered flow 118. The amount of energy recovered by the economizer does not reduce the temperature of the exhaust flow 118 below the condensation point of the pyrolysis vapors 51. The exhaust flow 118 enters the condenser 170.

The condenser 170 is a tube and shell heat exchanger as shown with a transparent outer housing on FIG. 14. A cooling fluid enters at 171 flowing counter current with the exhaust flow 118, and exits at 172. The cooling fluid removes thermal energy from the exhaust flow 118, cooling it below the condensation point of the pyrolysis vapors and in some cases below about 100 degrees Centigrade. The condensed pyrolysis oil 15 and NCG 50 exit the condenser as flow 119.

Figure 19:
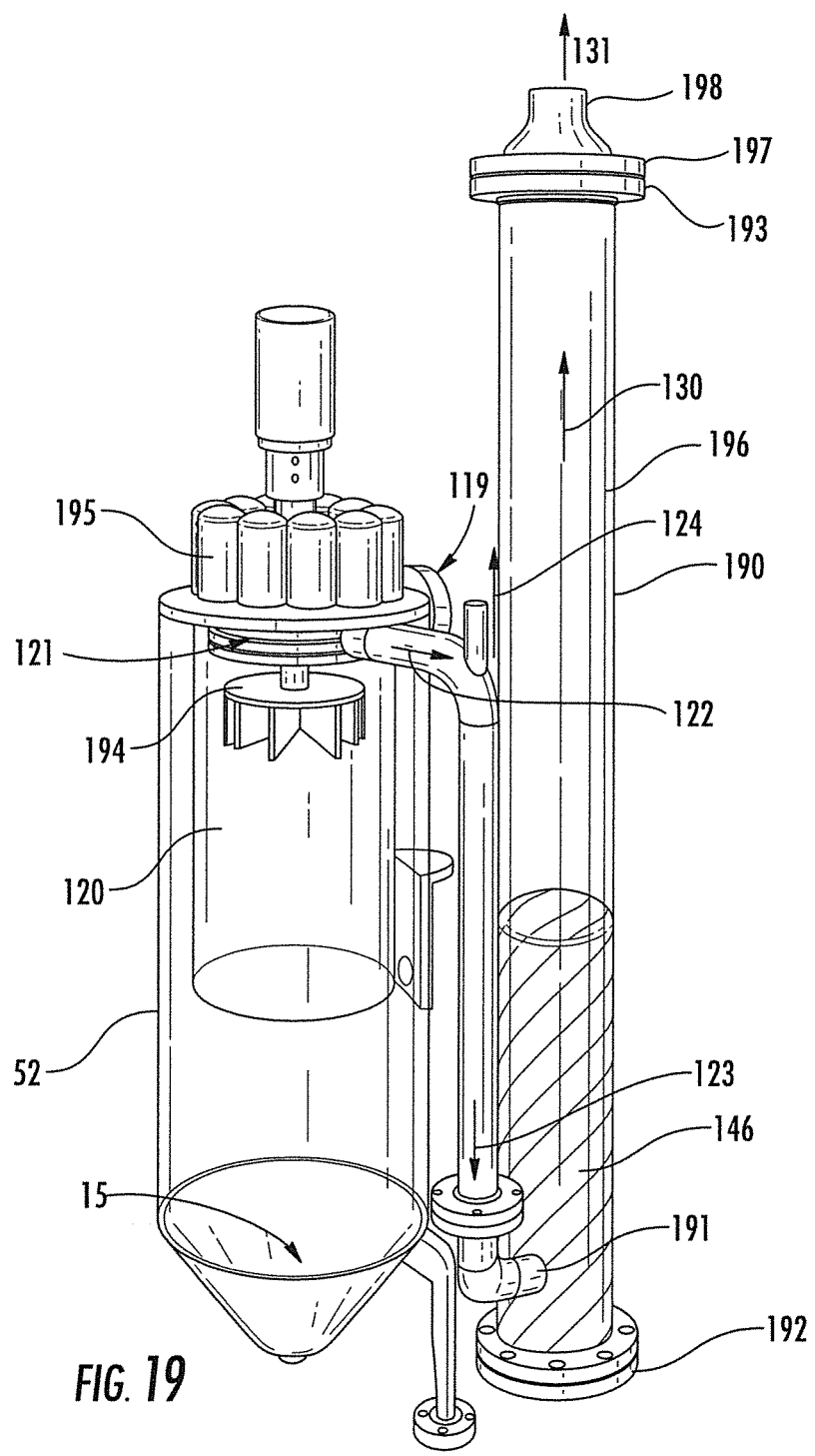
FIG. 19 is a perspective view of the quench tank, the demister, the disposable filters and the manual replenished draft filter.

Referring to FIGS. 13 and 19, the flow 119 enters the oil collection tank 52 where the liquid pyrolysis oil 15 and the NCG 50 are separated. The pyrolysis oil 15 is collected at the bottom of the oil collection tank 52 as a product of the pyrolysis unit 100. As shown in FIG. 13C, flow 120 consisting of NCG 50 and entrained sub micro sized droplets of pyrolysis oil or pyrolysis mist 55 passing through the dynamic demister 194. Due to the centrifugal action of the dynamic demister 194 some of the pyrolysis mist 55 is forced to coalesce into larger drops of pyrolysis oil 15 that drain back into the oil collection tank 52. The partially demisted flow 121 exits the demister 194 and passes through a plurality of disposable filters 195 also removing pyrolysis mist 55 and pyrolysis oil 15 form the flow 122. The partially demisted NCG flow 122 separates into two NCG entrainment flows 123 and 124.

Referring to FIG. 19; the draft filter inlet pressure 191 is maintained above atmospheric pressure. This provides an environment for collection of the pyrolysis oil 15 and the force required to allow removal of the pyrolysis oil 15 from the oil collection tank 52.

NCG flow 123 enters the lower end of the draft filter 190 where it passes through a biomass filtrate 146. Draft filter 190 is fitted with a flanged bottom 192 to allow opening and removal of the spent biomass filtrate 145 when the pyrolysis system 30 is not in operation. The clean NCG flows out of the draft filter at a pressure 196 as flow 130 passing through a fine mesh screen 193 that prevents the biomass filtrate 146 to form entraining with the flow 130. The clean NCG leaves the draft filter mesh screen 193 at pressure 198 as flow 131.

In this embodiment, a series of single stage variable displacement blowers, 150, 152, 154 and 156 along with accumulator 153 provide pressurized cleaned NCG 131, 132, 133 for use as entraining of the biomass 12 and char 14. Other embodiments can use a single variable displacement blower of multiple stages to achieve the desired flow 134 and 135 and pressure 240 as required by the pyrolysis unit 30. In another embodiment a pressurized supply of clean NCG can supply flow control valves that provide the desired entrainment flows 134 and 135.

Continuing with FIG. 13 and the splitting of the flow 122; the partially cleaned NCG 124 at pressure 191 is supplied to two flow control valves providing entraining NCG to the biomass 12 supplied by variable pitch auger 175. The entrained mixture 212 comprising biomass 12 and NCG flows 125 and 126 flow through the Dual Entrainment Rotary Valve inlet 755 where a portion is captured by one of the plurality of chambers 761 of the DERV cylinder 760 while a portion of the entrained mixture 212 flows through the DERV 750 as flow 163 where it mixes with draft pressure flow 161 and scavenge flow 162 forming bypass biomass flow mixture 160. The bypass biomass flow mixture 160 consisting of biomass 12, NCG 125, NCG 126, scavenge gas 162 and vacuum break air 161 flowing into the inlet of the cyclone separator 173 where the biomass 12 is removed from the flowing gasses as shown in FIG. 13B. The separated biomass 12 is then returned to the biomass bin 20. The separated gases 127, comprising NCG 125, NCG 126, scavenge gas 162, and draft control air 161 leave the cyclone 173 forming a cyclone exhaust 128, passing through the exhaust blower 209 and dispersed into the atmosphere as exhaust flow 129. In other embodiments the exhaust flow 129 is captured in whole or in part to recover certain materials and energy that exist in the exhaust flow 129. The exhaust flow 129 is proportionate to the flow of pressurized air 101 supplied to the pyrolysis unit 30 and the gases that are a product of the biomass pyrolysis.

Figure 23:
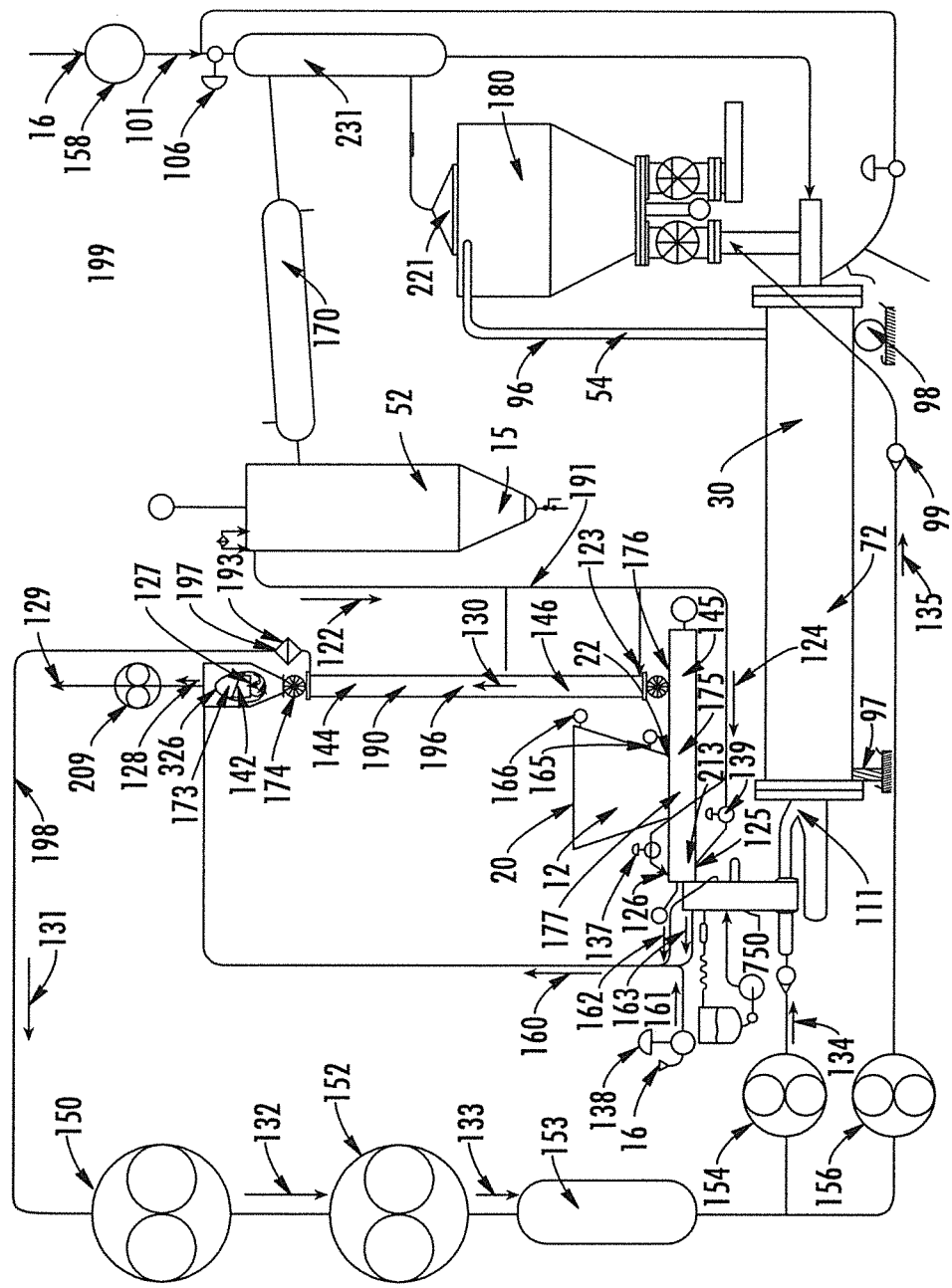
FIG. 23 is a flow diagram of the pyrolytic system of FIG. 13 in accordance with the present invention with a draft filter having a continuous biomass filtrate replenishment system.

FIG. 23 depicts another embodiment of a concentric chamber entrainment fast pyrolysis system 199 where the draft filter 190 is integrated with the biomass system 12. This improvement allows usage of the bypass biomass 143 as the biomass filtrate 146 in the draft filter 190, and eliminates the requirement to stop the pyrolysis unit 30 to remove and replenish the biomass filtrate 146.

Continuing with FIG. 23; the cyclone 173 and rotary valve 174 have been moved from the biomass bin 20 to the top of the draft filter 190. The biomass 143 separated by the cyclone 173 from the biomass flow mixture 160 is supplied to the draft filter trough rotary valve 174 as biomass filtrate 146. The draft filter flange 192 is replaced with a rotary valve 176 that delivers spent biomass filtrate 145 to the variable pitch auger 175. The auger 175 moves the spent biomass filtrate 145 towards the DERV entrainment inlet 755 while mixing the spent biomass filtrate 145, biomass 12, NCG flow 126, and NCG flow 127 to form flow entrainment mixture 213. The entrained mixture 213 flows through the DERV inlet 755 where a portion is captured by one of the plurality of chambers 761 of the DERV cylinder 760 while a portion of the entrained mixture 213 flows through the chamber 763 and out of the DERV as flow 163 and mixes with vacuum break flow 161 and DERV scavenge flow 162 forming bypass flow mixture 160. The bypass flow mixture 160 consisting of biomass 12, spent biomass filtrate 145, NCG 125, NCG 126, scavenge gas 162 and vacuum break air flow 161 flows into the inlet of the cyclone separator 173 where the biomass 12 and spend biomass filtrate 145 are separated from the flowing gasses as shown in FIG. 13B. The separated biomass 12 and spent biomass filtrate 145 are returned to the biomass bin 20. The separated gases 127, consisting of NCG 125, NCG 126, scavenge gas 162, and vacuum break air 161 leave the cyclone 173 forming cyclone exhaust 128, then passing through the exhaust blower 209 and is dispersed into the atmosphere as exhaust flow 129. In other embodiments the exhaust flow 129 is captured in whole or in part to recover certain materials and energy that exist in the exhaust flow 129. The exhaust flow 129 is proportionate to the flow of pressurized air 101 and gasses that are a product of the pyrolysis of the biomass. The ratio of spent biomass filtrate 145 to biomass 12 is maintained at a low value to ensure sufficient clean filtrate 143 within the draft filter. The rate of delivery of biomass filtrate is a function of the density of the entrained mixture 213 and the rate of rotation of the DERV cylinder 760.

The cleaned NCG flows out of the draft filter at a pressure 196 as flow 130 passing through a fine mesh screen 193 that prevents the biomass filtrate 146 to form entraining with the flow 130. The clean NCG leaves the draft filter mesh screen 193 at pressure 198 as flow 131.

Referring to FIGS. 1, 2, 13, 20 and 23; the fast pyrolysis systems 10, 100 and 199 are continuous processes that provide entrained fast pyrolysis of biomass 12 as described above. The systems 100 and 199 operate under the control of a programmable process controller 900. The Controller 900 has analog inputs 910, discrete inputs 920, analog outputs 930, discrete outputs 940, and variable speed drive controllers 950 that connect to the systems 100 and 199 to monitor, measure, direct and control the operation of the systems. Operator information and control input to the programmable process controller is provided via interface units 199.

While the invention has been described with respect to certain specific embodiments, it will be appreciated that many modifications and changes may be made by those skilled in the art without departing from the spirit and scope of the invention.

What is claimed is:

1. A system for rapidly pyrolysing biomass, the system comprising:
   a fast pyrolysis unit having an internal burn enclosure and a combustion chamber coupled at a first, open end with the burn enclosure, and at least one pyrolysis chamber concentrically arranged around the combustion chamber, the pyrolysis chamber having a first open end communicating with an open second end of the combustion chamber opposite the first end of the combustion chamber, such that the combustion chamber exhausts through its open second end into the first open end of the pyrolysis chamber;
   means for injecting biomass into the pyrolysis chamber at a generally constant rate;
   means for injecting fuel into the burn enclosure and for igniting the fuel to rapidly pyrolysize biomass in the pyrolysis chamber;
   means for removing exhaust gases containing entrained matter resulting from pyrolysis of the biomass within the pyrolysis unit; and
   means for separating and collecting bio-fuel elements entrained in the exhaust gases;
   wherein the means for injecting biomass into the combustion chamber at a generally constant rate comprises an entrainment rotary valve unit having an inlet port for receiving biomass and an outlet port for feeding biomass into the combustion chamber at the generally constant rate; and
   wherein the entrainment rotary valve unit comprises:
      a cylinder rotatable about an axis of rotation extending generally parallel to an axis of the inlet port, the rotatable cylinder having a plurality of cylinder chambers about the periphery of the cylinder spaced from the axis of rotation; and wherein
      each cylinder chamber is operable and dimensioned to receive a quantity of biomass when positioned adjacent the inlet port and for discharging the biomass quantity when positioned adjacent the outlet port.

2. The system recited in claim 1 further comprising a variable pitch auger for feeding biomass into the inlet port of the entrainment rotary valve, the variable pitch auger reducing the biomass density entering the inlet port of the entrainment rotary valve.

3. The system recited in claim 1 further comprising means for feeding a portion of the exhaust gases into biomass entering the inlet port of the entrainment rotary valve unit.

4. The system recited in claim 1 further comprising:
   means for drawing a vacuum at each cylinder chamber to facilitate loading of biomass into each cylinder chamber from the inlet port; and
   means for applying fluid pressure to each cylinder chamber to facilitate unloading of biomass from each cylinder chamber through the outlet port.

5. The system recited in claim 1 further comprising:
  means for separating and collecting entrained char from the exhaust gases; and
  means for injecting the collected char into the burn enclosure.

6. The system recited in claim 5 wherein the means for separating and collecting entrained char from the exhaust gases comprises a cyclone separator for separating at least a portion of char entrained in the exhaust gases.

7. The system recited in claim 6, further comprising:
  a hot gas filter located with the cyclone separator;
  means for temporarily interdicting the injection of biomass into the pyrolysis chamber; and
  means for temporarily causing a flow of oxygen-laden air into the hot gas filter to burn away any char caked in the hot gas filter.

8. The system recited in claim 1, further comprising means for filtering the exhaust gases through the biomass before injecting the biomass into the pyrolysis chamber.

9. The system recited in claim 1, further comprising a second pyrolysis chamber concentrically positioned around the first-recited pyrolysis chamber, with the first pyrolysis chamber having an second open end opposite its first open end, such that the second open end of the first pyrolysis chamber exhausts into a first open end of the second pyrolysis chamber.

10. The system recited in claim 1, further comprising means for removing pyrolytic oil mist from the exhaust gases.

11. The system recited in claim 10 wherein the pyrolytic oil mist removing means comprises:
  a draft filter column for holding a quantity of the biomass; and
  means for injecting the exhaust gases into the draft filter column.

12. The system recited in claim 11, further comprising means for recycling an output from the draft filter column through the pyrolysis unit.

13. The system recited in claim 1, wherein the combustion chamber and the pyrolytic chamber are both generally tubular and concentric.

14. A system for rapidly converting biomass, the system comprising:
  a fast pyrolysis unit having a burn enclosure;
  means for feeding biomass into the fast pyrolysis unit;
  means for injecting fuel into the burn enclosure and for igniting the fuel to rapidly pyrolysize biomass in the pyrolysis chamber;
  means for removing exhaust gases containing entrained matter resulting from pyrolytic reactions within the fast pyrolysis unit; and
  means for separating and collecting bio-fuel entrained in the exhaust gases;
  wherein the means for injecting biomass into the burn enclosure comprises an entrainment rotary valve unit having an inlet port for receiving biomass and an outlet port for feeding biomass into the burn enclosure at a generally constant rate; the entrainment rotary valve unit comprising a cylinder rotatable about an axis of rotation extending generally parallel to an axis of the inlet port, the rotatable cylinder having a plurality of cylinder chambers about the periphery of the cylinder spaced from the axis of rotation; and
  wherein each cylinder chamber is operable and dimensioned to receive a quantity of biomass when positioned adjacent the inlet port and for discharging the biomass quantity when positioned adjacent the outlet port.

15. The system recited in claim 14, further comprising means for filtering the exhaust gases to remove pyrolysis oil entrained therein by passing the exhaust gases through the biomass.

16. The system recited in claim 14, wherein the separating and collecting means comprises:
  a hot gas filter for receiving the exhaust gases;
  means for temporarily interdicting the feeding of biomass into the pyrolysis unit; and
  means for injecting oxygen-laden air into the hot gas filter to burn away any char caked in the hot gas filter.

17. The system recited in claim 16, wherein the separating and collecting means comprises a dynamic demister for receiving mist from the exhaust gases and coalescing pyrolytic oil therein.

18. The system recited in claim 14, wherein the separating and collecting means comprises:
  a draft filter column having a quantity of biomass therein; and
  means for injecting the exhaust gases into the draft filter column.

19. The system recited in claim 14, further comprising means for injecting char derived from the separating and collecting means into the burn enclosure with the injection of fuel therein.

* * * * *